United States Patent
Ki et al.

(10) Patent No.: US 12,306,717 B2
(45) Date of Patent: May 20, 2025

(54) SYSTEMS, METHODS, AND DEVICES FOR DATA RECOVERY USING PARITY SPACE AS RECOVERY SPACE

(71) Applicant: Samsung Electronics Co., Ltd., Suwon-si (KR)

(72) Inventors: Yang Seok Ki, Palo Alto, CA (US); Sungwook Ryu, Palo Alto, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

(21) Appl. No.: 17/227,262

(22) Filed: Apr. 9, 2021

(65) Prior Publication Data
US 2021/0349781 A1    Nov. 11, 2021

Related U.S. Application Data

(63) Continuation-in-part of application No. 17/109,053, filed on Dec. 1, 2020, now Pat. No. 11,803,446.
(Continued)

(51) Int. Cl.
*G06F 11/10* (2006.01)
*G06F 3/06* (2006.01)
(Continued)

(52) U.S. Cl.
CPC ........ *G06F 11/1092* (2013.01); *G06F 3/0619* (2013.01); *G06F 3/0659* (2013.01);
(Continued)

(58) Field of Classification Search
CPC ............. G06F 11/1092; G06F 11/1658; G06F 11/3034; G06F 11/1088; G06F 11/10;
(Continued)

(56) References Cited

U.S. PATENT DOCUMENTS

| 5,546,533 A | 8/1996 | Koyama |
| 5,914,967 A | 6/1999 | Yomtoubian |

(Continued)

FOREIGN PATENT DOCUMENTS

| CN | 1924786 A | 3/2007 |
| CN | 101084486 A | 12/2007 |

(Continued)

OTHER PUBLICATIONS

Office Action for U.S. Appl. No. 17/226,059, dated Oct. 29, 2021.
(Continued)

*Primary Examiner* — Matthew M Kim
*Assistant Examiner* — Matthew N Putaraksa
(74) *Attorney, Agent, or Firm* — Renaissance IP Law Group LLP

(57) ABSTRACT

A method may include operating a first storage device and a second storage device as a redundant array configured to use parity information to recover information from a faulty storage device, operating the first storage device in a fault resilient mode with at least partial read capability based on a fault condition of the first storage device, and rebuilding information from the first storage device in a parity space of the second storage device. Rebuilding the information from the first storage device in the parity space of the second storage device may include copying the information from the first storage device to the parity space of the second storage device. The method may further include copying the rebuilt information from the parity space of the second storage device to a replacement storage device.

18 Claims, 34 Drawing Sheets

Related U.S. Application Data

(60) Provisional application No. 63/137,133, filed on Jan. 13, 2021, provisional application No. 63/057,744, filed on Jul. 28, 2020, provisional application No. 63/052,854, filed on Jul. 16, 2020, provisional application No. 63/051,158, filed on Jul. 13, 2020, provisional application No. 63/023,243, filed on May 11, 2020.

(51) Int. Cl.
*G06F 11/16* (2006.01)
*G06F 11/30* (2006.01)

(52) U.S. Cl.
CPC ........ *G06F 3/0689* (2013.01); *G06F 11/1658* (2013.01); *G06F 11/3034* (2013.01)

(58) Field of Classification Search
CPC .. G06F 11/1096; G06F 3/0619; G06F 3/0659; G06F 3/0689; G06F 3/0604; G06F 3/065
See application file for complete search history.

(56) References Cited

U.S. PATENT DOCUMENTS

| | | | |
|---|---|---|---|
| 6,049,439 A | 4/2000 | Ono et al. | |
| 6,154,853 A * | 11/2000 | Kedem | G06F 11/1084 711/114 |
| 6,301,644 B1 | 10/2001 | Andoh et al. | |
| 6,883,126 B1 | 4/2005 | Herman et al. | |
| 6,995,943 B1 | 2/2006 | Shrestha et al. | |
| 7,343,546 B2 | 3/2008 | Edirisooriya et al. | |
| 7,451,346 B2 | 11/2008 | Katsuragi et al. | |
| 7,536,595 B1 | 5/2009 | Hiltunen et al. | |
| 7,574,623 B1 | 8/2009 | Goel et al. | |
| 7,590,664 B2 | 9/2009 | Kamohara et al. | |
| 7,640,450 B1 | 12/2009 | Anvin et al. | |
| 7,774,643 B2 | 8/2010 | Wang | |
| 7,797,567 B2 | 9/2010 | Otaka et al. | |
| 7,904,749 B2 | 3/2011 | Kawaguchi | |
| 8,015,436 B2 | 9/2011 | Winokur | |
| 8,082,390 B1 | 12/2011 | Fan et al. | |
| 8,099,623 B1 | 1/2012 | Li et al. | |
| 8,261,016 B1 | 9/2012 | Goel | |
| 8,386,834 B1 | 2/2013 | Goel et al. | |
| 8,458,515 B1 * | 6/2013 | Saeed | G06F 11/1076 714/6.24 |
| 8,589,723 B2 | 11/2013 | Kumar et al. | |
| 8,769,535 B2 | 7/2014 | Mani | |
| 8,812,902 B2 | 8/2014 | Deepak | |
| 8,838,893 B1 | 9/2014 | Randall et al. | |
| 8,839,028 B1 * | 9/2014 | Polia | G06F 11/1088 714/6.24 |
| 8,924,775 B1 | 12/2014 | Siew et al. | |
| 8,977,813 B2 | 3/2015 | Burd | |
| 9,122,405 B1 * | 9/2015 | Ludwig | G06F 11/1092 |
| 9,176,813 B2 | 11/2015 | Guo et al. | |
| 9,268,489 B2 | 2/2016 | Aizman et al. | |
| 9,378,083 B2 | 6/2016 | Ghaly et al. | |
| 9,378,093 B2 | 6/2016 | Cooper et al. | |
| 9,397,703 B2 | 7/2016 | Ghaly et al. | |
| 9,547,562 B1 | 1/2017 | Feathergill et al. | |
| 9,710,317 B2 | 7/2017 | Gupta et al. | |
| 9,715,436 B2 | 7/2017 | Karrotu et al. | |
| 9,728,277 B2 | 8/2017 | Lee et al. | |
| 9,740,560 B2 | 8/2017 | Molaro et al. | |
| 9,823,840 B1 * | 11/2017 | Brooker | G06F 3/0604 |
| 9,830,236 B2 | 11/2017 | Antony | |
| 9,940,028 B2 | 4/2018 | Tomlin | |
| 10,013,325 B1 | 7/2018 | Garrett, Jr. et al. | |
| 10,082,965 B1 | 9/2018 | Tamilarasan et al. | |
| 10,095,506 B2 | 10/2018 | Venkatesh et al. | |
| 10,102,082 B2 | 10/2018 | Cabrera et al. | |
| 10,121,551 B1 | 11/2018 | Miller et al. | |
| 10,157,004 B2 | 12/2018 | Michaeli | |
| 10,210,062 B2 | 2/2019 | Agombar et al. | |
| 10,263,842 B2 | 4/2019 | Bursell | |
| 10,296,255 B1 * | 5/2019 | Tummala | G06F 3/065 |
| 10,372,558 B2 | 8/2019 | Park et al. | |
| 10,445,200 B2 | 10/2019 | Park et al. | |
| 10,452,289 B1 | 10/2019 | Colgrove et al. | |
| 10,459,808 B2 | 10/2019 | Walls | |
| 10,558,563 B2 | 2/2020 | Kanno | |
| 10,572,161 B2 | 2/2020 | Subramanian et al. | |
| 10,585,749 B2 | 3/2020 | Kachare et al. | |
| 10,796,762 B2 | 10/2020 | Peddle et al. | |
| 10,884,648 B2 | 1/2021 | Guo et al. | |
| 10,915,401 B2 | 2/2021 | Fujii et al. | |
| 10,929,229 B2 * | 2/2021 | Stoica | G06F 3/0689 |
| 11,055,172 B2 * | 7/2021 | Foley | G06F 11/1044 |
| 11,132,256 B2 | 9/2021 | Roberts | |
| 11,314,571 B2 | 4/2022 | Li | |
| 11,909,809 B2 | 2/2024 | Kawabata | |
| 2002/0162057 A1 | 10/2002 | Talagala | |
| 2004/0250033 A1 | 12/2004 | Prahlad et al. | |
| 2005/0120267 A1 | 6/2005 | Burton et al. | |
| 2006/0069870 A1 | 3/2006 | Nicholson et al. | |
| 2006/0075185 A1 | 4/2006 | Azzarito et al. | |
| 2006/0143507 A1 | 6/2006 | Tanaka | |
| 2007/0101188 A1 | 5/2007 | Lin | |
| 2007/0220313 A1 | 9/2007 | Katsuragi et al. | |
| 2007/0250723 A1 | 10/2007 | Shima et al. | |
| 2008/0126849 A1 | 5/2008 | Kotzur et al. | |
| 2008/0126855 A1 | 5/2008 | Higashijima et al. | |
| 2008/0168304 A1 * | 7/2008 | Flynn | G06F 1/183 711/E12.04 |
| 2009/0106584 A1 | 4/2009 | Nakayama et al. | |
| 2009/0164536 A1 | 6/2009 | Nasre et al. | |
| 2009/0222617 A1 | 9/2009 | Yano et al. | |
| 2009/0248756 A1 | 10/2009 | Akidau et al. | |
| 2010/0049905 A1 | 2/2010 | Duchi | |
| 2010/0079885 A1 | 4/2010 | McKean | |
| 2010/0125751 A1 | 5/2010 | McKean | |
| 2011/0012147 A1 | 1/2011 | Bierhuizen et al. | |
| 2011/0047437 A1 * | 2/2011 | Flynn | H05K 7/1444 711/E12.019 |
| 2012/0117322 A1 * | 5/2012 | Satran | G06F 12/0284 711/E12.017 |
| 2013/0047028 A1 | 2/2013 | Daikokuya et al. | |
| 2013/0054907 A1 * | 2/2013 | Ikeuchi | G06F 11/2087 711/159 |
| 2013/0080828 A1 | 3/2013 | Sheffield | |
| 2013/0097375 A1 | 4/2013 | Ida | |
| 2013/0173955 A1 | 7/2013 | Hallak et al. | |
| 2013/0191703 A1 | 7/2013 | Meaney et al. | |
| 2013/0282953 A1 | 10/2013 | Orme et al. | |
| 2014/0032834 A1 | 1/2014 | Cudak et al. | |
| 2014/0089730 A1 | 3/2014 | Watanabe et al. | |
| 2014/0149787 A1 | 5/2014 | Shanbhag et al. | |
| 2014/0195847 A1 | 7/2014 | Webman et al. | |
| 2014/0281689 A1 * | 9/2014 | Fischer | G06F 11/1092 714/6.22 |
| 2014/0359347 A1 | 12/2014 | Fuxa | |
| 2015/0100720 A1 | 4/2015 | Flynn et al. | |
| 2015/0100822 A1 * | 4/2015 | Ohno | G06F 3/067 714/6.32 |
| 2015/0234709 A1 | 8/2015 | Koarashi | |
| 2015/0269025 A1 | 9/2015 | Krishnamurthy et al. | |
| 2016/0004467 A1 | 1/2016 | Green et al. | |
| 2016/0077911 A1 | 3/2016 | Malshe et al. | |
| 2016/0132394 A1 | 5/2016 | Niewczas | |
| 2016/0299722 A1 | 10/2016 | Seo et al. | |
| 2016/0342465 A1 | 11/2016 | Cudak et al. | |
| 2017/0060421 A1 * | 3/2017 | Dawkins | G06F 3/0689 |
| 2017/0123654 A1 | 5/2017 | Standing | |
| 2017/0177216 A1 | 6/2017 | Freyensee et al. | |
| 2017/0220374 A1 | 8/2017 | Beveridge et al. | |
| 2017/0351431 A1 | 12/2017 | Dewitt et al. | |
| 2018/0011376 A1 | 1/2018 | Cho et al. | |
| 2018/0011649 A1 | 1/2018 | Hashimoto et al. | |
| 2018/0018231 A1 | 1/2018 | Okada et al. | |
| 2018/0052750 A1 | 2/2018 | Sun et al. | |
| 2018/0067658 A1 | 3/2018 | Tripathy et al. | |
| 2018/0101450 A1 | 4/2018 | Park et al. | |

(56) References Cited

U.S. PATENT DOCUMENTS

| | | | |
|---|---|---|---|
| 2018/0113761 A1 | 4/2018 | Ko et al. | |
| 2018/0316756 A1 | 11/2018 | Kuramkote et al. | |
| 2019/0043604 A1* | 2/2019 | Baca | G11C 29/883 |
| 2019/0050161 A1 | 2/2019 | Wysocki et al. | |
| 2019/0065318 A1* | 2/2019 | Sahasrabudhe | G06F 11/1088 |
| 2019/0087272 A1* | 3/2019 | Lingarajappa | G06F 3/0619 |
| 2019/0087290 A1 | 3/2019 | Rutman et al. | |
| 2019/0138239 A1* | 5/2019 | Lv | G06F 11/1076 |
| 2019/0196910 A1 | 6/2019 | Gu et al. | |
| 2019/0377637 A1 | 12/2019 | Pitchumani et al. | |
| 2019/0384670 A1 | 12/2019 | Kuroki et al. | |
| 2020/0020398 A1 | 1/2020 | Miller et al. | |
| 2020/0034235 A1 | 1/2020 | Gao et al. | |
| 2020/0042388 A1 | 2/2020 | Roberts | |
| 2020/0127684 A1 | 4/2020 | Park et al. | |
| 2020/0135280 A1 | 4/2020 | Hu | |
| 2020/0159621 A1 | 5/2020 | Velayuthaperumal et al. | |
| 2020/0310932 A1 | 10/2020 | Hutchison et al. | |
| 2020/0409809 A1* | 12/2020 | Liu | G06F 11/1662 |
| 2021/0011640 A1* | 1/2021 | Hua | G06F 3/0632 |
| 2021/0124504 A1* | 4/2021 | Chiu | G06F 3/0622 |
| 2021/0124506 A1* | 4/2021 | Han | G06F 3/0608 |
| 2021/0279153 A1* | 9/2021 | Patel | G06F 11/1469 |
| 2021/0349782 A1 | 11/2021 | Ki et al. | |
| 2021/0373796 A1 | 12/2021 | Matosevich et al. | |
| 2022/0012130 A1 | 1/2022 | Ki et al. | |
| 2022/0012142 A1 | 1/2022 | Ryu et al. | |
| 2022/0012147 A1 | 1/2022 | Ki et al. | |
| 2022/0019366 A1* | 1/2022 | Freilich | G06F 21/6218 |
| 2022/0291996 A1 | 9/2022 | Ki et al. | |
| 2023/0016170 A1 | 1/2023 | Barker, Jr. et al. | |
| 2024/0012713 A1 | 1/2024 | Steinmetz et al. | |

FOREIGN PATENT DOCUMENTS

| | | |
|---|---|---|
| CN | 101727363 A | 6/2010 |
| JP | H06175792 A | 6/1994 |
| JP | H06274404 A | 9/1994 |
| JP | H10301721 A | 11/1998 |
| JP | H11184644 A | 7/1999 |
| JP | 2006350599 A | 12/2006 |
| JP | 2012509521 A | 4/2012 |
| JP | 2013246479 A | 12/2013 |
| JP | 2017201519 A | 11/2017 |
| JP | 2021033856 A | 3/2021 |
| JP | 2021089625 A | 6/2021 |
| TW | 201413449 A | 4/2014 |
| TW | 201435729 A | 9/2014 |
| TW | 201729102 A | 8/2017 |
| TW | 201810258 A | 3/2018 |
| TW | 201911041 A | 3/2019 |
| TW | 201917580 A | 5/2019 |
| TW | 202009695 A | 3/2020 |
| WO | 2018142622 A1 | 8/2018 |

OTHER PUBLICATIONS

Notice of Allowance for U.S. Appl. No. 17/109,053, dated Mar. 18, 2022.
Office Action for U.S. Appl. No. 17/232,144, dated Jul. 21, 2022.
Final Office Action for U.S. Appl. No. 17/226,059, dated May 11, 2022.
Office Action for U.S. Appl. No. 17/226,059, dated Sep. 16, 2022.
Final Office Action for U.S. Appl. No. 17/226,059, dated Apr. 6, 2023.
Final Office Action for U.S. Appl. No. 17/232,144, dated Mar. 9, 2023.
Office Action for U.S. Appl. No. 17/226,059, dated Sep. 6, 2023.
Office Action for U.S. Appl. No. 17/232,144, dated Jun. 30, 2023.
Office Action for U.S. Appl. No. 17/741,440, dated Jul. 19, 2023.
Office Action for U.S. Appl. No. 17/827,657, dated Aug. 10, 2023.
Final Office Action for U.S. Appl. No. 17/226,059, mailed Mar. 15, 2024.
Final Office Action for U.S. Appl. No. 17/232,144, mailed Jan. 26, 2024.
Final Office Action for U.S. Appl. No. 17/827,657, mailed Feb. 16, 2024.
Office Action for U.S. Appl. No. 17/741,440, mailed Apr. 19, 2024.
Office Action for U.S. Appl. No. 17/232,144, mailed May 8, 2024.
Corrected Notice of Allowability for U.S. Appl. No. 17/226,059, mailed Aug. 8, 2024.
Notice of Allowance for U.S. Appl. No. 17/226,059, mailed Jun. 26, 2024.
Office Action for U.S. Appl. No. 17/827,657, mailed Jul. 16, 2024.
Corrected Notice of Allowability for U.S. Appl. No. 17/226,059, mailed Oct. 9, 2024.
Corrected Notice of Allowability for U.S. Appl. No. 17/226,059, mailed Sep. 26, 2024.
Final Office Action for U.S. Appl. No. 17/741,440, mailed on Nov. 8, 2024.
Notice of Allowance for U.S. Appl. No. 17/232,144, mailed Nov. 6, 2024.
Final Office Action for U.S. Appl. No. 17/827,657, mailed Dec. 4, 2024.
Office Action for U.S. Appl. No. 17/741,440, mailed Mar. 21, 2025.

\* cited by examiner

| Case ID | Operation Status | User Data | ReUse /How to |
|---|---|---|---|
| 1 | Fatal Error | Invalid | Can't |
| 2 | Fatal Error | Invalid | Can / Format NVM |
| 3 | Read Only Mode | Valid | Can't |
| 4 | Write Through Mode | Valid | Can't |
| 5 | Temperature Safe Mode | Valid | Can't |
| 6 | Read Only Mode | Valid | Can / Format NVM |

FIG. 2A

| Command | Description |
|---|---|
| FR_INFO_RESILIENCY_TYPE | Returns the type of fault resiliency in case of failure. |
| FR_INFO_RETENTION_PERIOD | Returns the average retention period without reprogramming by NAND media. This information is used for temporary read-only mode (FR_MODE_TEMP_READ_ONLY) or temporary partial read-only mode (FR_MODE_TEMP_PARTIAL_READ_ONLY). This is the upper-bound of retention time for data on the device from the time of the failure. |
| FR_INFO_IOPS | Returns the maximum time remaining for data integrity. This information is used for temporary read-only mode (FR_MODE_TEMP_READ_ONLY) or temporary partial read-only mode (FR_MODE_TEMP_PARTIAL_READ_ONLY). This is the lower-bound of retention time for data on the device from the time of the failure.<br><br>Note: the unit of time may be determined based on the patrol period. |
| FR_INFO_EARLIEST_EXPIRY | Returns the percentage of the maximum available IOPS on failure. This information is used for low performance mode (FR_MODE_PERFORMANCE). |
| FR_INFO_BW | Returns the percentage of the maximum available IOPS on failure. This information is used for low performance mode (FR_MODE_PERFORMANCE). |
| FR_INFO_SPACE | Returns the available space on failure. This information is used for small capacity with read-only mode (FR_MODE_CAPACITY_READ_ONLY) or small capacity (FR_MODE_CAPACITY) type. |

FIG. 2B

| | |
|---|---|
| •FAULT_RESILIENT_FEATURE | – This returns the fault resilient classes and features in each class that this device supports<br>– FR_FULLY_RESILIENT<br>  •FR_POWER_CYCLE: device can be recovered by power cycling<br>  •FR_REFORMAT: device can be recovered by reformatting<br>– FR_PARTIAL_RESILIENT<br>  •FR_PERFORMANCE_LOSS: device performance is reduced<br>    – FR_IOPS: IOPS can be reduced<br>    – FR_BW: Bandwidth can be reduced<br>  •FR_CAPABILITY_LOSS<br>    – FR_SUSTAINABLE_READ_ONLY: device can be read-only longer than NAND retention time<br>    – FR_UNSUSTAINABLE_READ_ONLY: device can be read-only up to NAND retention time<br>  •FR_SPACE_LOSS<br>    – FR_SPACE: the device storage space is reduced<br>– VULNERABLE<br>  •GRACEFUL_EXIT |
| •FAULT_RESILIENT_STATUS | – This returns the status of device after fault resilient recovery is done.<br>– FR_IOPS: the available IOPS is X%<br>– FR_BW: the available BW is Y%<br>– FR_SPACE: the available storage space is Z%<br>– FR_RETENTION: average retention period of media used in this device |
| •FAULT_RESILIENT_VOLATILE_BLOCKS (H) | – This returns a list of LBA ranges that reach to the retention period in next H hours<br>– This can be used to determine the blocks that need to be relocated for unsustainable read only |
| •FAULT_RESILIENT_INVALID_DATA_BLOCKS | – This returns a list of LBA ranges that become invalid after switch to a fault resilient mode |

FIG. 2C

| Mode | Description | P | UP | RO | VRO | IA |
|---|---|---|---|---|---|---|
| 1 | FR_MODE_POWER_CYCLE | 100% | | | | |
| 2 | FR_MODE_REFORMAT | 100% | | | | |
| 3 | FR_MODE_CAPACITY_READ_ONLY* | X% | | (100-X)% | | |
| 4 | FR_MODE_CAPACITY* | X% | | | | (100-X)% |
| 5 | FR_MODE_PERFORMANCE | | 100% | | | |
| 6 | FR_MODE_READ_ONLY | | | 100% | | |
| 7 | FR_MODE_PARTIAL_READ_ONLY* | | | X% | | (100-X)% |
| 8 | FR_MODE_TEMP_READ_ONLY* | | | | 100% | |
| 9 | FR_MODE_TEMP_PARTIAL_REAL_ONLY* | | | | X% | (100-X)% |
| 10 | FR_MODE_VULNERABLE | | | | | 100% |
| 11 | FR_MODE_NORMAL | 100% | | | | |

FIG. 23

SYSTEMS, METHODS, AND DEVICES FOR DATA RECOVERY USING PARITY SPACE AS RECOVERY SPACE

CROSS-REFERENCE TO RELATED APPLICATIONS

This application is a Continuation-In-Part of U.S. patent application Ser. No. 17/109,053 entitled "Fault Resilient Storage Device" filed Dec. 1, 2020 which is incorporated by reference and which claims priority to and the benefit of U.S. Provisional Patent Application No. 63/051,158, filed Jul. 13, 2020, entitled "Fault Resilient Storage Device and Interfaces" which is incorporated by reference, U.S. Provisional Patent Application No. 63/052,854, filed Jul. 16, 2020, entitled "Fault Resilient Drive with Sustainable Read-only Feature" which is incorporated by reference, and U.S. Provisional Patent Application No. 63/057,744, filed Jul. 28, 2020, entitled "FAULT RESILIENT RAID-0 METHOD USING FAULT RESILIENT DRIVES" which is incorporated by reference; this application also claims priority to, and the benefit of, U.S. Provisional Patent Application Ser. No. 63/023,243 filed May 11, 2020, entitled "Fault Resilient Storage Devices and Interfaces" which is incorporated by reference, and U.S. Provisional Patent Application Ser. No. 63/137,133 filed Jan. 13, 2021, entitled "Systems, Methods, and Devices for Storage Data Recovery" which is incorporated by reference.

FIELD

This disclosure relates generally to storage, and more specifically to systems, methods, and devices for data recovery using parity space as recovery space.

BACKGROUND

A storage system may recover data from a faulty storage device by rebuilding data using parity information from another storage device.

The above information disclosed in this Background section is only for enhancement of understanding of the background of the invention and therefore it may contain information that does not constitute prior art.

SUMMARY

In some embodiments, a fault resilient storage device may be capable of operating in various resilient modes, while maintaining partial capability, or of returning to full functionality in spite of internal faults. One of the ways in which the storage device may maintain partial capability is to operate, in some circumstances, in a read-only mode, in which the storage device may respond to read requests from a host but return an error message if it receives a write request from a host. In a RAID-0 storage system, the possibility that a storage device may transition to operating in a read-only mode may be accommodated by redistributing the strips that make up a stripe for any write operations performed after the storage device has transitioned to operating in read-only mode.

According to an embodiment of the present invention, there is provided a method for operating a storage device including storage media, the method including: determining, by the storage device, that the storage device is in a first fault state from which recovery is possible by power cycling the storage device or by formatting the storage media; determining, by the storage device, that the storage device is in a second fault state from which partial recovery is possible by operating the storage device with reduced performance, with reduced capacity, or in a read-only mode; and operating the storage device with reduced performance, with reduced capacity, or in the read-only mode.

In some embodiments, the method further includes: determining, by the storage device, that the storage device is in a third fault state different from the first fault state and the second fault state; and operating the storage device in a mode in which read and write operations are not performed, and in which the storage device returns errors in response to received read or write commands, wherein: the storage device includes a controller including a first core and a second core, and the third fault state includes a sub-state in which the first core determines that the second core has failed.

In some embodiments, the method further includes: receiving a query, from a host, regarding a status of the storage device, and responding to the query with a status corresponding to a status in a status hierarchy.

In some embodiments, the status hierarchy includes a first level, including: a fully resilient status, corresponding to the first fault state; and a partially resilient status, corresponding to the second fault state.

In some embodiments, the partially resilient status includes a first sub-status indicating a loss of capability, the first sub-status including: a first sub-sub-status, indicating operation in a sustainable read-only mode; and a second sub-sub-status, indicating operation in an unsustainable read-only mode.

In some embodiments, the receiving of the query includes receiving the query through a nonvolatile memory express (NVMe) interface, and the responding to the query includes responding through the nonvolatile memory express (NVMe) interface.

In some embodiments: the first fault state includes a first sub-state in which a program execution error of a controller of the storage device has caused incorrect data to be written to the storage media; the determining that the storage device is in the first fault state includes determining that a pointer is out of range; and the first fault state includes a second sub-state in which a program execution error of a controller of the storage device has occurred since the most recent write to storage media by the controller.

In some embodiments, the method further includes reformatting a portion of the storage media, wherein the reformatting includes reformatting the entire storage media.

In some embodiments, the method includes operating the storage device with reduced performance.

In some embodiments, the operating with reduced performance includes: receiving, from a host connected to the storage device, a write command including data; writing the data to the storage media; and sending a command completion to the host, wherein the writing of the data to the storage media and the sending of the command completion to the host is performed as part of a synchronous write.

In some embodiments, the operating with reduced performance includes: performing a first write to the storage media; waiting, during an interval corresponding to the reduced performance; and performing a second write to the storage media.

In some embodiments, the method includes operating the storage device with reduced capacity.

According to an embodiment of the present invention, there is provided a storage device including: a processing circuit; and storage media, the processing circuit being configured to: determine that the storage device is in a first fault state from which recovery is possible by power cycling the storage device or by formatting the storage media; determine that the storage device is in a second fault state from which partial recovery is possible by operating the storage device with reduced performance, with reduced capacity, or in a read-only mode; and operate the storage device with reduced performance, with reduced capacity, or in the read-only mode.

In some embodiments, the processing circuit is further configured to: receive a query, from a host, regarding a status of the device, and respond to the query with a status corresponding to a status in a status hierarchy, wherein the status hierarchy includes a first level, including: a fully resilient status, corresponding to the first fault state; and a partially resilient status, corresponding to the second fault state.

In some embodiments, the receiving of the query includes receiving the query through a nonvolatile memory express (NVMe) interface, and the responding to the query includes responding through the nonvolatile memory express (NVMe) interface.

In some embodiments, the processing circuit is configured to operate the storage device with reduced performance, wherein the operating with reduced performance includes: performing a first write to the storage media; waiting, during an interval corresponding to the reduced performance; and performing a second write to the storage media.

According to an embodiment of the present invention, there is provided a system, including a storage device including: means for processing; and storage media, the means for processing being configured to: determine that the storage device is in a first fault state from which recovery is possible by power cycling the storage device or by formatting the storage media; determine that the storage device is in a second fault state from which partial recovery is possible by operating the storage device with reduced performance, with reduced capacity, or in a read-only mode; and operate the storage device with reduced performance, with reduced capacity, or in the read-only mode.

In some embodiments, the means for processing is further configured to: receive a query, from a host, regarding a status of the device, and respond to the query with a status corresponding to a status in a status hierarchy, wherein the status hierarchy includes a first level, including: a fully resilient status, corresponding to the first fault state; and a partially resilient status, corresponding to the second fault state.

In some embodiments, the receiving of the query includes receiving the query through a nonvolatile memory express (NVMe) interface, and the responding to the query includes responding through the nonvolatile memory express (NVMe) interface.

In some embodiments, the means for processing is configured to operate the storage device with reduced performance, wherein the operating with reduced performance includes: receiving, from a host connected to the storage device, a write command including data; writing the data to the storage media; and sending a command completion to the host, wherein the writing of the data to the storage media and the sending of the command completion to the host is performed as part of a synchronous write.

A method may include operating a first storage device and a second storage device as a redundant array configured to use parity information to recover information from a faulty storage device, operating the first storage device in a fault resilient mode with at least partial read capability based on a fault condition of the first storage device, and rebuilding information from the first storage device in a parity space of the second storage device. Rebuilding the information from the first storage device in the parity space of the second storage device may include copying the information from the first storage device to the parity space of the second storage device. The method may further include copying the rebuilt information from the parity space of the second storage device to a replacement storage device. The method may further include updating first data for a write operation of the first storage device in the parity space of the second storage device. The method may further include copying the updated first data from the parity space of the second storage device to the replacement storage device. The method may further include calculating parity information for at least a portion of the rebuilt information. Rebuilding the information from the first storage device in a parity space of the second storage device may be performed, at least in part, by a background process. Rebuilding the information from the first storage device in a parity space of the second storage device may be performed, at least in part, by a batch process. The information from the first storage device may include data. The method may further include reading first data for a read operation of the first storage device based on a rebuild point of the parity space of the second storage device. The first data for the read operation may be read from the first storage device. The first data for the read operation may be read from the rebuilt information in the parity space of the second storage device. The method may further include updating first data for a write operation of the first storage device in the parity space of the second storage device, and reading, for a read operation of the first storage device, the updated first data from the parity space of the second storage device. The method may further include receiving write data for a write operation of the first storage device, and writing the write data to the parity space of the second storage device.

A system may include a controller, a first storage device, and a second storage device, wherein the first storage device is capable of operating in a fault resilient mode with at least partial read capability based on a fault condition of the first storage device, and wherein the controller may be configured to operate the first storage device and the second storage device as a redundant array configured to use parity information to recover information from a faulty storage device, and rebuild information from the first storage device in a parity space of the second storage device. The controller may be further configured to copy the rebuilt information from the parity space of the second storage device to a replacement storage device. The controller may be further configured to read first data for a read operation from the first storage device based on a rebuild point of the parity space of the second storage device. The controller may be further configured to receive write data for a write operation of the first storage device, and write the write data to the parity space of the second storage device.

A storage array controller may include logic configured to operate a first storage device, a second storage device, and a third storage device as a redundant array of independent storage devices (RAID) with parity, wherein the first storage device is configured to operate the first storage device in a fault resilient mode with at least partial read capability based on a fault condition of the first storage device, and rebuild information from the first storage device based on the fault condition of the first storage device by copying information from the first storage device to a parity space of the second storage device. The logic may be further configured to read data for a read operation from the first storage device based on a rebuild point of the parity space of the second storage device.

BRIEF DESCRIPTION OF THE DRAWINGS

The figures are not necessarily drawn to scale and elements of similar structures or functions may generally be represented by like reference numerals or portions thereof for illustrative purposes throughout the figures. The figures are only intended to facilitate the description of the various embodiments described herein. The figures do not describe every aspect of the teachings disclosed herein and do not limit the scope of the claims. To prevent the drawing from becoming obscured, not all of the components, connections, and the like may be shown, and not all of the components may have reference numbers. However, patterns of component configurations may be readily apparent from the drawings. The accompanying drawings, together with the specification, illustrate example embodiments of the present disclosure, and, together with the description, serve to explain the principles of the present disclosure.

FIG. 2A is a table of fault states of a storage device in accordance with example embodiments of the disclosure.

FIG. 2B is a table of commands for sending to a storage device by a host in accordance with example embodiments of the disclosure.

FIG. 2C is a table showing a hierarchy of resilient modes in accordance with example embodiments of the disclosure.

FIG. 23 illustrates a table of some example embodiments of fault resilient modes and associated logical block address (LBA) space types that may be implemented by a storage device in accordance with example embodiments of the disclosure.

DETAILED DESCRIPTION

The detailed description set forth below in connection with the appended drawings is intended as a description of exemplary embodiments of a system and method for resilient operation of storage devices and systems containing storage devices provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

In some embodiments, a fault resilient storage device may be capable of operating in various resilient modes, and capable of maintaining partial capability, or returning to full functionality, in spite of internal faults. For example, in response to a temperature sensor failure, the storage device may operate at a reduced rate, or at a reduced rate for write operations, or it may cease to perform write operations entirely. In response to a transient failure that may have corrupted the storage media, the storage device may reformat the storage media. In response to a transient failure that did not corrupt the storage media, the storage device may cycle power. One of the ways in which the storage device may maintain partial capability is to operate, in some circumstances, in a read-only mode, in which the storage device may respond to read requests from a host but return an error message if it receives a write request from a host. It may also move data that is about to expire to a rescue area, so that the data will not be lost as a result of expiring. In a RAID-0 storage system, the possibility that a storage device may transition to operating in a read-only mode may be accommodated by redistributing the strips that make up a stripe for any write operations performed after the storage device has transitioned to operating in read-only mode.

Figure 1:
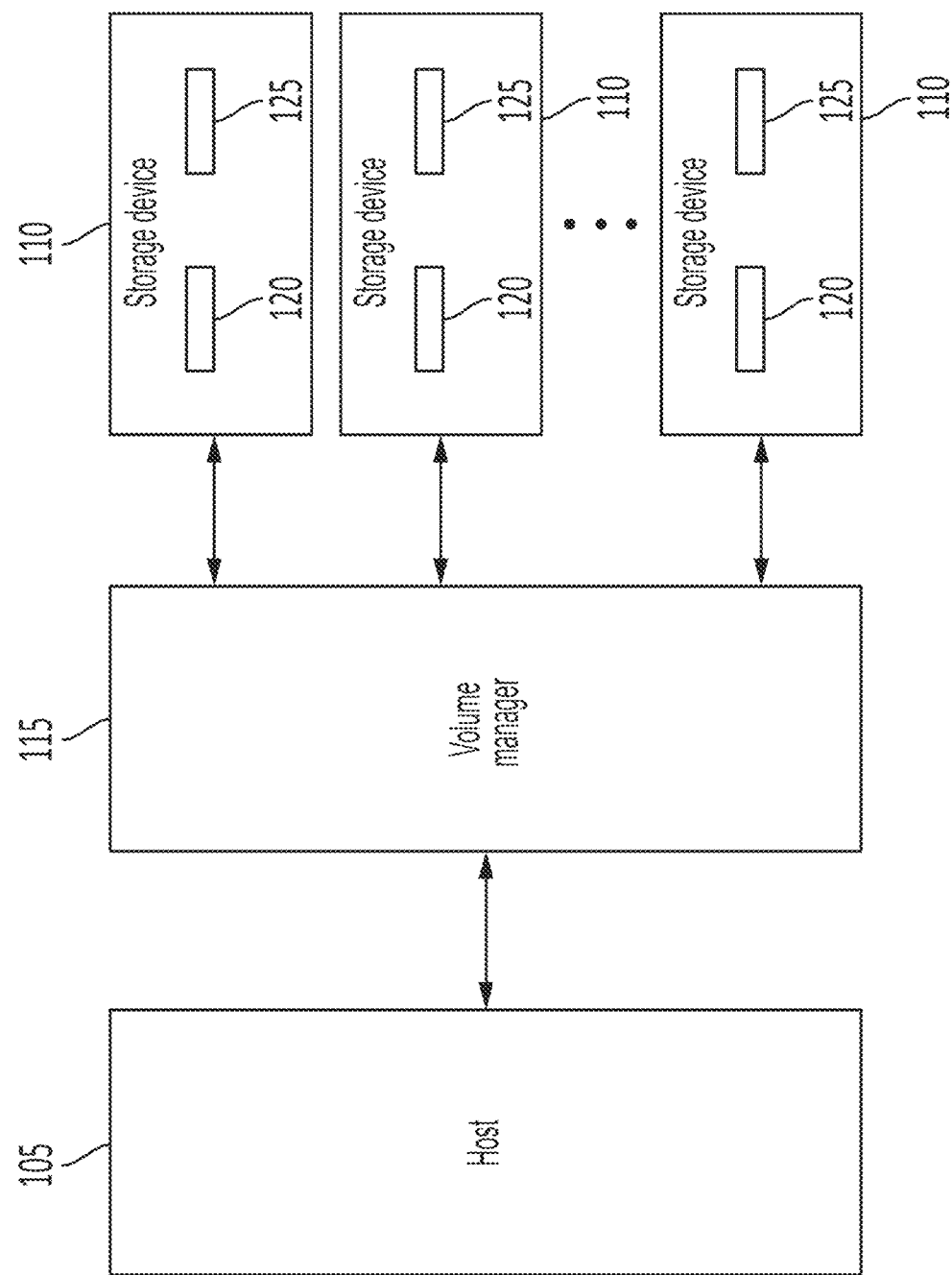
FIG. 1 is a block diagram of a data storage system in accordance with example embodiments of the disclosure.

FIG. 1 shows a computing system, including a host 105 connected to one or more storage devices 110 (or "drives") in accordance with example embodiments of the disclosure. The storage devices 110 may be connected to the host 105 through a volume manager 115 (discussed in further detail below) as shown, or they may be directly connected to the host 105. In some embodiments, a storage device 110 may experience an internal fault condition, and the storage device may exhibit various resilient behaviors, as discussed in further detail below, to mitigate the system-level impact of the fault condition. Each storage device 110 may be a solid state drive (SSD) and it may include a controller 120 (or "control circuit") and storage media 125 (e.g., not AND (NAND) flash memory). The smallest erasable unit in the storage device 110 may be referred to as a "block" and the smallest writeable unit in the storage device 110 may be referred to as a "page". Each storage device 110 may have a form factor that is any one of a plurality of form factors suitable for persistent storage devices, including but not limited to 2.5", 1.8", MO-297, MO-300, M.2, and Enterprise and Data Center SSD Form Factor (EDSFF), and it may have an electrical interface, through which it may be connected to the host 105, that is any one of a plurality of interfaces suitable for persistent storage devices, including Peripheral Component Interconnect (PCI), PCI express (PCIe), Ethernet, Small Computer System Interface (SCSI), Serial AT Attachment (SATA), and Serial Attached SCSI (SAS).

The storage media 125 may have a retention period (which may depend on the usage history of the storage media 125, and, as such, may vary within the storage media 125); data that has been stored longer than the retention period (i.e., data having an age exceeding the retention period) may become unreliable and may be said to have expired. Data may be stored in the storage media 125 using an error correcting code, which may be a block code. When data is read from the storage media 125, a quantity of raw data, referred to as a code block, may be read from the storage media 125, and an attempt to decode it may be made. If the attempt fails, additional attempts (read retrials) may be made. With use, a portion, e.g., a block, of the storage media 125 may degrade to the point that the retention period becomes unacceptably short, and the block may be classified as a "bad block". To avoid allowing this circumstance to render the entire storage media 125 inoperable, reserve space, referred to as "bad block management reserve space" may be present (e.g., included in each flash memory die or in each flash memory plane), and the controller 120, or another controller internal to the flash memory die or to the flash memory plane may begin to use a block in the reserve and cease to use the bad block.

FIG. 2A is a table of fault conditions (or "fault states"), each labeled with a case identifier ("Case ID") in accordance with example embodiments of the disclosure. Case 1 is any fault condition in which the storage device 110 is no longer capable of performing read or write operations, and that cannot be resolved by cycling power or reformatting the storage media. The state in which the storage device 110 behaves in this manner may have various sub-states, with, e.g., each sub-state corresponding to a different failure mechanism. Such a state, or fault condition (in which the storage device 110 is no longer capable of performing read or write operations, and that cannot be resolved by cycling power or reformatting the storage media) may be caused, for example, by a portion of the controller's firmware becoming corrupted (in which case it may be possible for the controller to restart into a safe mode, in which the corrupted instructions are not executed) or by a failure of a processing circuit in the storage device 110 (e.g., the failure of a processing circuit that manages interactions with the storage media but is not responsible for communications with the host 105). When a fault condition of this type occurs, the storage device 110 may respond to any read or write command from the host 105 with an error message.

Case 2 is any fault condition (i) in which the storage device 110 is no longer capable of performing read or write operations and (ii) from which recovery is possible by cycling the power of the storage device 110 or by reformatting the storage media. Such a fault condition may be caused, for example, by a program execution error of the controller 120 of the storage device 110 (e.g., a pointer that is out of range as a result of a bit flip in the random-access memory (RAM) of the controller 120, or an instruction that is incorrect, as a result of a bit flip). If the program execution error has not caused the controller 120 to write incorrect data to the storage media 125 (e.g., if the program execution error occurred since the most recent write to storage media by the controller), then power cycling the storage device may be sufficient to restore the storage device 110 to normal operation; if the program execution error has caused the controller 120 to write erroneous data to the storage media 125, then reformatting the storage media 125 may be sufficient to restore the storage device 110 to normal operation.

Case 3 is any fault condition that may be mitigated by operating the storage device 110 in a read-only mode, and for which reformatting the storage media 125 will not restore full functionality. Examples of such faults include (i) a temperature sensor failure, and (ii) a portion of the storage media 125 having transitioned to a read-only mode. In the case of the temperature sensor failure, the failure may be detected by determining that a temperature sensor reading is out of range (e.g., has exceeded a threshold temperature), and in such a case the risk of overheating of the storage device 110 may be reduced by avoiding write operations, which may dissipate more power than read operations. The transitioning to a read-only mode of a portion of the storage media 125 may occur, for example, for flash memory storage media 125, if a flash memory plane or die exhausts the bad block management reserve space used for run time bad block management. For example, the storage device 110 may, while attempting to performing a read operation, make an unsuccessful attempt to decode a data item, determine that the block storing the data is a bad block and upon moving the data from the bad block to the bad block management reserve space, determine that the remaining bad block management reserve space is less than a threshold size and therefore insufficient to insure the reliability of the plane or die. The storage device 110 may then determine that bad block management is no longer being performed, and transition to a read-only mode. Operation of the read-only mode is discussed in further detail below. As used herein, a "data item" is any quantity of data being processed in one operation, e.g., the data resulting from decoding a code block may be a data item.

Case 4 is any fault condition that may be mitigated by operating the storage device 110 in a write-through mode. For example, if a power supply backup capacitor in the storage device 110 fails, the device may, in response to any write commands received from the host, complete the write to the storage media 125 before sending a command completion to the host 105, so that if power fails before the write to the storage media 125 has been completed, the host is not incorrectly informed that the write was completed successfully. Operating in the write-through mode may result in a reduction of performance (in terms of throughput and latency).

Case 5 is any fault condition that may be mitigated by operating the storage device 110 in a manner that reduces power dissipation. For example, in the case of a temperature sensor failure, the storage device 110 may operate in a read-only mode as mentioned above, or it may reduce the rate at which operations (e.g., write operations, which may dissipate more power than read operations) are performed, to reduce power dissipation in the storage device 110. For example, the storage device 110 may perform a first write to the storage media, then wait, during an interval corresponding to the reduced performance (the waiting resulting in a decrease in the rate at which write operations are performed); and then perform another (e.g., a second) write to the storage media.

Case 6 is any fault condition that may be mitigated by operating the storage device 110 in a read-only mode, and for which reformatting the storage media 125 will restore full functionality. The third column of the table of FIG. 2A indicates, for each case, whether valid user data remain available, and whether the storage device 110 may, e.g., by reformatting the storage media 125, be returned to full functionality.

As exemplified by the cases listed in FIG. 2A, in some embodiments three levels of fault resiliency may be achievable by a storage device 110, a fully resilient mode, a partially resilient mode, and a vulnerable mode. In the fully resilient mode, the storage device 110 may operate with "self-healing" features, and the storage device 110 may be capable of recovering full functionality (although the user data in the device may be lost) by resetting operations such as power cycling or formatting of the storage media 125.

In the partially resilient mode, the storage device 110 may operate with lower performance, smaller capacity, or reduced capability, when a fault condition exists. For example, as mentioned above, if a power supply backup capacitor fails, all writes may be completed (i.e., command completions may be sent to the host 105) only after data is written to the storage media 125 (i.e., only synchronous writes may be performed), slowing the operation of the storage device 110, and reducing its performance. The user data may be preserved, in this circumstance. The storage devices 110 may operate with smaller capacity if the reserve space for bad block management run time bad block (RTBB) is exhausted. In this circumstance, the affected dies in the storage device 110 may be excluded from the disk space and the overall disk capacity may be reduced. The user data on the lost space may be lost. For example, if a set in IO determinism or a zone in a zoned namespace is no longer capable of accepting new data writes, the set or the zone may be excluded from disk space but the remaining disk space may remain available for read and write operations. The user data on the zone or set may be lost.

The storage device 110 may operate with reduced capability if a storage device 110 does not allow write operations, and switches to a read-only mode. The storage device 110 may be capable operating in two types of read-only mode: a sustainable read-only mode (which may be referred to as a "first read-only mode"), and an unsustainable read-only mode (which may be referred to as a "second read-only mode"). In the sustainable read-only mode, the storage device 110 may continue to serve read requests beyond the retention period of the storage media 125. The unsustainable read-only mode may be employed when it is not feasible to operate in the sustainable read-only mode, e.g., when there is insufficient unused storage space to set up a rescue space (discussed in further detail below). When transitioning to the unsustainable read-only mode, the storage device 110 may send to the host 105 a notification that the storage device 110 is operating in the second (unsustainable) read-only mode, and that data items stored in the storage device 110 will be allowed to expire (e.g., at the end of their respective retention periods). In the unsustainable read-only mode, the storage device 110 may continue to serve read requests during the retention period of the storage media 125, and, if the storage device 110 encounters data integrity issues (as detected, for example, by one or more unsuccessful attempts to decode data during read operations, the storage device 110 may report the invalid data region. A storage device 110 operating in the vulnerable mode may, as mentioned above, be incapable of performing read or write operations, and may perform a graceful exit, continuing to receive commands from the host and returning errors.

In some embodiments, five logical block address (LBA) space types may be defined, referred to as (i) performing space (P), (ii) underperforming space (UP), (iii) read-only space (RO), (iv) volatile read-only space (VRO), and (v) inaccessible space (IA). Performing (P) space may be LBA space containing valid data, which is capable of being read and written in a normal manner without sacrificing performance. Underperforming (UP) space may be LBA space containing valid data, which is capable of being read and written in a normal manner, but with degraded performance (e.g., degraded write performance). Read-only (RO) space may be LBA space containing valid data, which is read-only. The storage device 110 may respond with error messages to write commands from the host directed to this type of LBA space. The data in read-only space may remain valid for a period of time exceeding the retention period. Volatile read-only (VRO) space may be read-only, and the storage device 110 may respond with error messages to write commands from the host directed to this type of LBA space. Data in this type of LBA space may be temporarily valid, and may become invalid when it expires, i.e., when the age of the data in the storage media 125 reaches the retention period of the storage media 125. Inaccessible (IA) space may be LBA space containing invalid data, which is not accessible from the host. The table of FIG. 23 shows some combinations of LBA space types that may be present in a storage device 110 in each of the fault conditions identified in the first column of the table in accordance with example embodiments of the disclosure. The modes identified with an asterisk (*) may support the host's using a get feature command to retrieve the detailed information about LBA space. FIG. 2B shows arguments of a "get feature" command, that may be passed to a storage device 110 to query the storage device 110 regarding its state and the values of associated parameters ("IOPS" means input and output operations per second) in accordance with example embodiments of the disclosure.

The table of FIG. 2C shows nonvolatile memory express (NVMe) commands that a host 105 may employ to query a storage device 110 regarding its status, and a hierarchy of enumerated constants, within the category of fault resilient features, that the storage device 110 may employ to respond in accordance with example embodiments of the disclosure. As illustrated in FIG. 2C, the hierarchy may include a first level, including a fully resilient status, a partially resilient status, and a vulnerable status. Sub-statuses, and sub-sub-statuses may also be defined. For example, as shown in FIG. 2C, the partially resilient status includes a first sub-status indicating a loss of capability, and the first sub-status includes a first sub-sub-status, indicating operation in the sustainable read-only mode; and a second sub-sub-status, indicating operation in the unsustainable read-only mode.

Figure 3A:
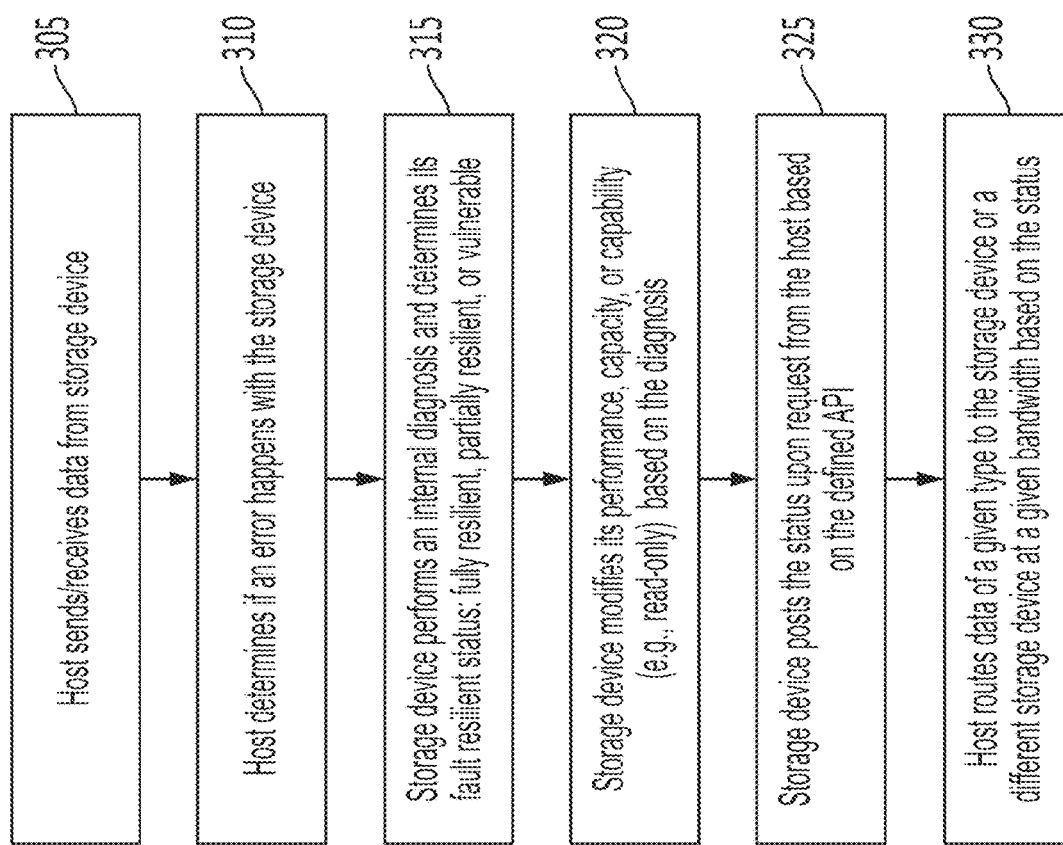
FIG. 3A is a flow chart for a first method of operation of a fault-resilient storage device in accordance with example embodiments of the disclosure.
Figure 3B:
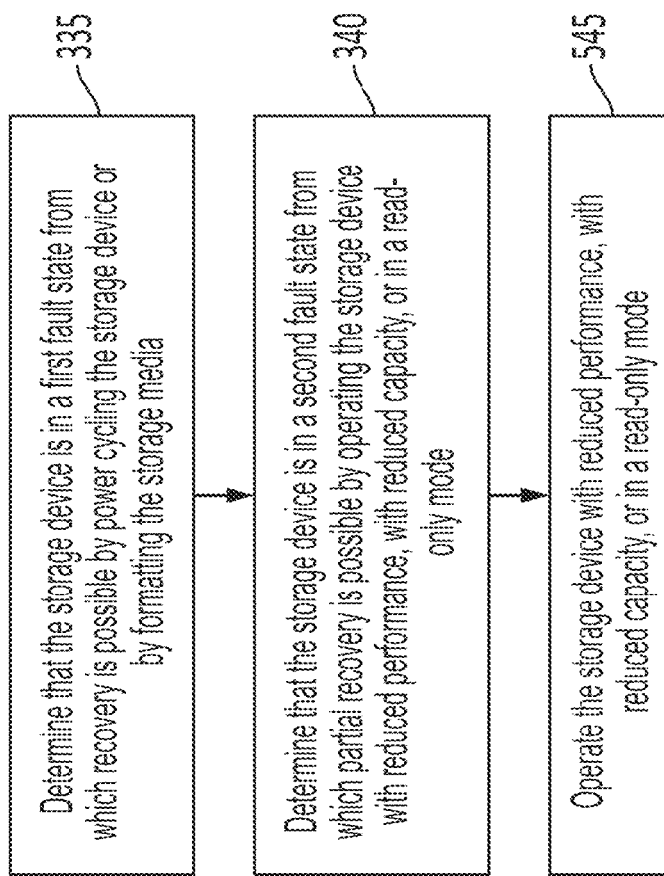
FIG. 3B is a flow chart for a second method of operation of a fault-resilient storage device in accordance with example embodiments of the disclosure.

FIG. 3A is a flow chart of a method for operating in a fault resilient mode, in accordance with example embodiments of the disclosure. At 305, the host 105 sends or receives data from storage device; at 310, the host 105 determines whether an error has occurred in the storage device; at 315, the storage device 110 performs an internal diagnosis and determines its fault resilient status (e.g., fully resilient, partially resilient, or vulnerable); at 320, the storage device 110 modifies its performance, capacity, or capability (e.g., transitioning to a read-only mode) based on the diagnosis; at 325, the storage device 110 posts the status upon request from the host 105 based on an application programming interface (API); and at 330, the host 105 routes data of a given type to the storage device 110 or to a different storage 110 device at a given bandwidth based on the status. FIG. 3B is a flow chart showing details of a method for operating in a fault resilient mode in accordance with example embodiments of the disclosure. The method includes: at 335, determining, by the storage device, that the storage device is in a first fault state from which recovery is possible by power cycling the storage device or by formatting the storage media; at 340, determining, by the storage device, that the storage device is in a second fault state from which partial recovery is possible by operating the storage device with reduced performance, with reduced capacity, or in a read-only mode; and, at 345, operating the storage device with reduced performance, with reduced capacity, or in a read-only mode.

A number embodiments and variations on the embodiments disclosed herein may also be constructed. A field programmable gate array (FPGA) or embedded processor may perform internal block checks and send asynchronous updates to the host 105 on the status of the storage device 110. Events may occur and be transmitted to the host 105 (e.g., temperature, or other parameters internal to the device). The host 105 may poll the storage devices 110 on a predetermined schedule, if there is no device driver feature for providing notification. An FPGA or embedded processor may monitor the historical performance of the storage device 110 and use machine learning to provide predictive analytics (e.g., a likelihood to be in a given fault resilient state). Commands may be introduced in the NVMe specification; for example, telemetry information of the NVMe specification may be expanded (to report the state of the storage device 110). Some embodiments may be implemented in, for example, Ethernet storage devices or key-value (KV) storage devices.

In some embodiments, the host may (i) send different data types (e.g., file types such as image, video, text, or high-priority or low-priority data), based on the status of the storage device 110 (for instance, high priority data or real-time data may not be written to a device that is considered in the partially vulnerable mode); (ii) reduce the transmission rate if the storage device 110 is in a partially vulnerable state and in a lower performance state; (iii) send a reduced total amount of data if the storage device 110 is in a partially vulnerable and lower capacity state; (iv) read data at the greatest rate possible, and store the data elsewhere, if the storage device 110 is in a partially vulnerable unsustainable read-only mode, so as to avoid exceeding the retention period (in such a circumstance, the host may calculate the needed data rate based on the amount of data to be copied and on the retention period); (v) ignore data "read" from a vulnerable storage device 110 since it is erroneous, and simply delete the data as it is received by the host 105, (vi) temporarily reroute read/write input and output to a cache in a fully resilient storage device 110 that is being power cycled or formatted, based on messages that control the timing of such events between the host and the storage devices 110. An FPGA on a partially vulnerable SSD that has had a capacity decrease may filter incoming data writes and only write a portion of that data to the storage device 110. In some cases, the filtering may include compression. Such an FPGA may receive various kinds of data (e.g., file types such as image, video, text, or high-priority or low-priority data) from a host 105 and filter based on the status of the storage device 110. For instance, the FPGA may determine that high priority data should not be written to a storage device 110 that is in the partially vulnerable mode. The FPGA may send a rejection message to the host 105 and give a reason for the rejection. Alternatively, the FPGA may filter out a certain type of data (e.g., image data) for writing to a partially resilient lower-capacity state storage device 110. For example, if a storage device 110 loses performance (e.g., operates at a reduced write rate), latency-sensitive reads and writes may be rejected.

In some embodiments, as mentioned above, a storage device 110 may operate in one of two read-only modes, which may be referred to as a "sustainable" (or "first") read-only mode and an "unsustainable" (or "second") read-only mode. In the unsustainable read-only mode, the storage device 110 may simply reject any write commands it may receive from the host 105, and it may (i) attempt to execute read commands for unexpired data or (ii) attempt to execute all read commands, returning the data resulting from any successful decoding attempts and an error code (an indication that a data item cannot be read, e.g., a zero) if decoding does not succeed.

In the sustainable read-only mode, the storage device 110 may be capable of serving external read requests beyond the retention period of the storage media 125. The storage device 110 may take no action except to return an error message, in response to any write commands from the host 105, although it may perform writes to the storage media 125 for internal purposes, as described in the following. To make possible the preservation of data beyond the retention period, the storage device 110 may allocate a space, referred to as the "rescue space", to which it moves data that is about to expire (e.g., data having an age exceeding a threshold age, the threshold age being based on (e.g., being 80% of) the retention period of the storage media 125), so that the expiration of the data is then postponed by the retention period of the rescue space. If data in the rescue space are about to expire, they may be moved again, within the rescue space, as often as needed, to prevent data loss. In some embodiments, the storage device 110 moves data well in advance of its expiration, taking advantage of periods of low load, for example, to perform such moves. As mentioned above, a transition to sustainable read-only mode may be triggered by the exhaustion of bad block management reserve space. In this circumstance, the affected planes or dies may become read-only and may be excluded from the physical address space of the storage device 110, once all of the data stored in them has been relocated to the rescue space.

The storage device 110 may respond to read commands from the host 105 across the entire LBA space. Because the physical space of the storage device 110 may be reduced (e.g., because a portion of the storage media 125 has become read-only and its data are being moved (or have been moved) to the rescue space), but the logical space of device is unchanged, the storage device 110 may return zero if the host 105 sends a read command within LBA space that cannot be mapped to Physical Block Address (PBA) space.

The rescue space may be allocated from overprovisioning space, or from any unused space on the storage device 110. If a set in IO determinism or a zone in zoned namespace is not writeable, the set or the zone may become read-only and excluded from physical address space once all data is relocated. Rescue space may be created dynamically using namespaces. One or more namespaces may be used for user data, and an additional namespace may be created for rescue space. When the storage device 110 transitions to sustainable read-only mode, one or more of the namespaces for user data may be reduced in size, and the size of the namespace for rescue space may be increased.

If the size of the region of the storage media 125 affected by the fault (e.g., within which bad block management reserve space has been exhausted) exceeds the size of the available rescue space, then the storage device 110 may move only the data that will be expiring soonest (e.g., the oldest data), or move only data that is tagged as being important or related to a given file type (e.g., images, video, or documents), or move data of a contiguous type (e.g., all of the data related to a file), and leave behind other data. The set of file types deemed important may be user configurable. In some embodiments employing KV storage devices 110, the data importance may be compressed or encoded with key value pairs.

In some embodiments, the storage device 110 may determine that the amount of rescue space available is less than a threshold size and therefore insufficient to support operating in the sustainable read-only mode, and, as a result the storage device 110 may transition to the unsustainable read-only mode. Such a determination may be made when the fault is first detected, or it may be that when the fault is first detected the storage device 110 initially transitions to the sustainable read-only mode, and that after some time the rescue space is consumed (e.g., by the continuing expiration of data in the faulty part of the storage media 125) to the extent that the available rescue space decreases to less than the threshold size, and the storage device 110 may then transition from the sustainable read-only mode to the unsustainable read-only mode. Upon transitioning from the sustainable read-only mode to the unsustainable read-only mode, the storage device 110 may notify the host 105 of the transition, and the host 105 may then attempt to copy as much of the data as possible from the storage device 110 to another storage device, before the data expires.

In some circumstances data may be lost over a period of, e.g., one day or one hour. As such, an FPGA in the storage device 110 may monitor the nature of the data on the drive (e.g., old, tagged, continuous, or by file-type) to facilitate transfer when the storage device 110 transitions to sustainable read-only mode. The FPGA may queue the data, or order the data to be transferred to the rescue space, in order of precedence, and it may compress the data when the data is moved into the rescue space. Some embodiments may be implemented in, for example, Ethernet storage devices or key-value (KV) storage devices.

Figure 4:
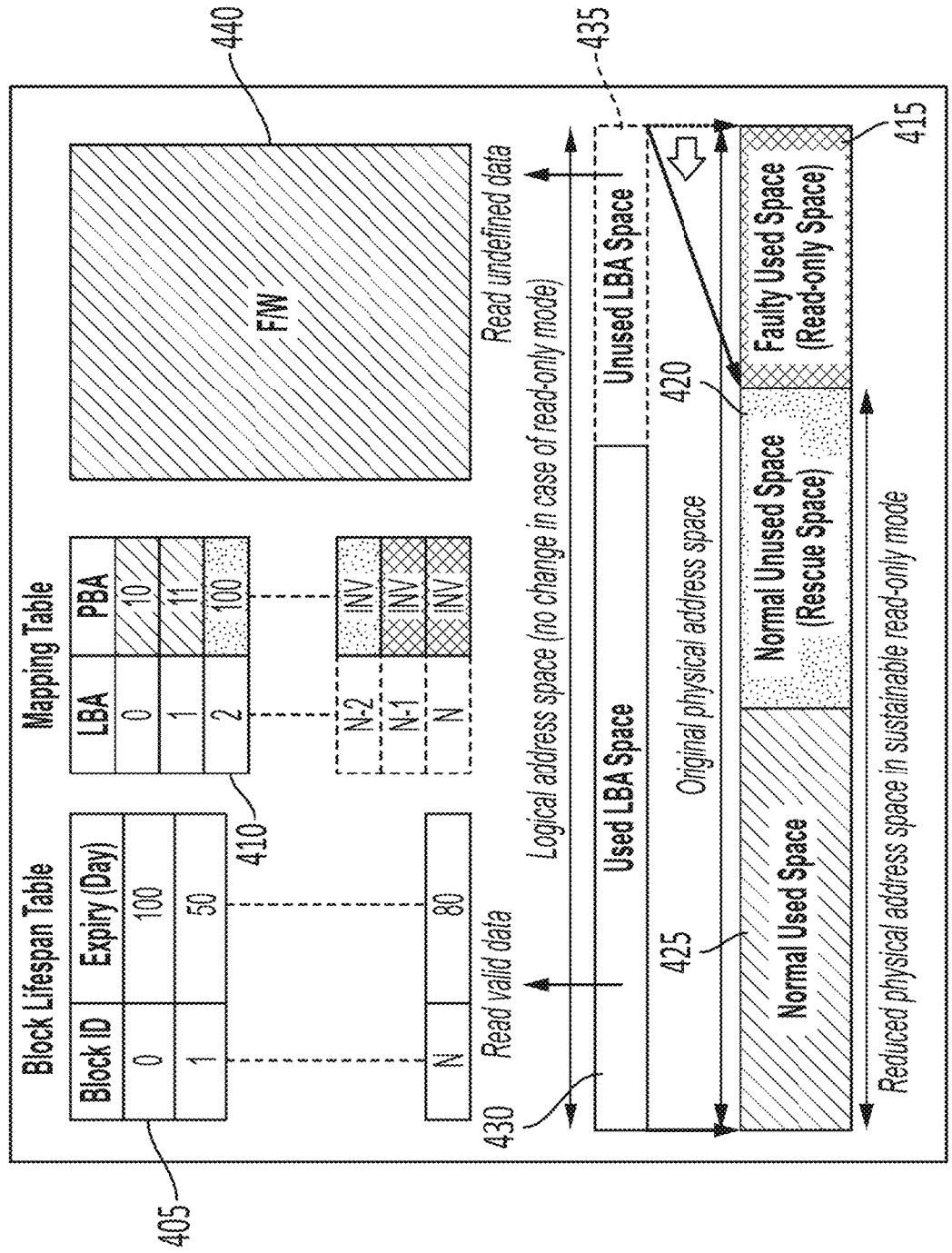
FIG. 4 is a schematic data layout diagram of a storage device in accordance with example embodiments of the disclosure.

FIG. 4 is a schematic data layout diagram of a storage device 110 in accordance with example embodiments of the disclosure. A block lifespan table 405 lists the retention period of each block in the storage device 110, and a mapping table 410 lists mappings from logical block address to physical block addresses. When the storage device 110 transitions to the sustainable read-only mode, the storage device 110 copies data from the faulty used space 415 (the physical space affected by the fault condition) to the rescue space 420. Data in the normal used space 425 is handled as it would be if the storage device 110 were in normal operating mode (instead of being in the sustainable read-only mode). Because the fault condition results in a loss of physical space, there is a corresponding reduction in the size of the used LBA space 430, with some of the previously available LBA space becoming unused LBA space 435. Firmware 440, executed by the controller 120, may cause the data to be moved, as described above, and the tables to be updated.

Figure 5A:
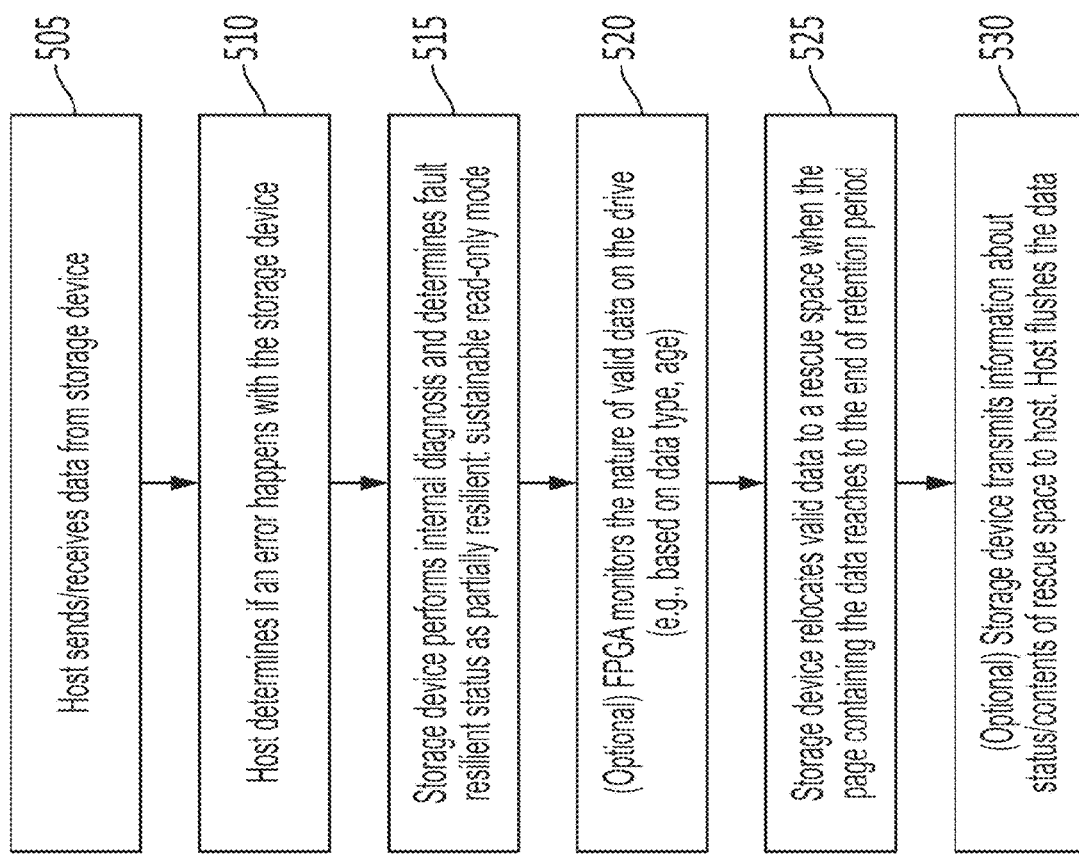
FIG. 5A is a flow chart for a first method of operation of a storage device in a fault-resilient read-only mode in accordance with example embodiments of the disclosure.
Figure 5B:
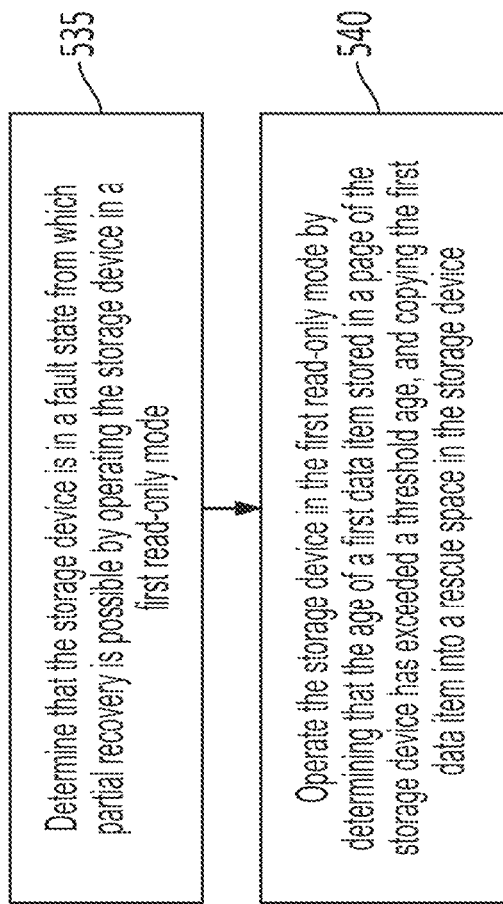
FIG. 5B is a flow chart for a second method of operation of a storage device in a fault-resilient read-only mode in accordance with example embodiments of the disclosure.

FIG. 5A is a flow chart for a method of transitioning to the sustainable read-only mode, in accordance with example embodiments of the disclosure. At 505, the host 105 sends/receives data from storage device; at 510, the host 105 determines if an error has occurred in the storage device; at 520, the host 105 determines if an error happens with the storage device; at 525, the storage device 110 performs an internal diagnosis and transitions to the sustainable read-only mode; at 530, an FPGA may optionally monitor the nature of valid data on the storage device 110 (e.g., based on data type, or age); at 535, the storage device 110 relocates valid data to the rescue space when the age of the data approaches the retention period; and at 540, the storage device 110 may optionally transmit information about the status and contents of the rescue space to the host 105, which flushes the data. FIG. 5B is a flow chart showing details of a method for operating in a sustainable read-only mode in accordance with example embodiments of the disclosure. The method includes, at 535, determining, by the storage device, that the storage device is in a fault state from which partial recovery is possible by operating the storage device in a first read-only mode; and, at 540, operating the storage device in the first read-only mode, by determining that the age of a first data item stored in a page of the storage device has exceeded a threshold age, and copying the first data item into a rescue space in the storage device.

In some embodiments, as mentioned above, a RAID-0 system including an array of storage devices 110 and a volume manager 115 may be constructed to accommodate a transition of any of the storage devices 110 of the RAID-0 system to a read-only mode (e.g., to the sustainable read-only mode). In normal operation, the volume manager 115 may be responsible for striping the data across the array of storage devices 110, e.g., writing one strip of each stripe to a respective storage device 110 of the array of storage devices 110 (each stripe being composed of such strips). In such a system, when any of the array of storage devices 110 transitions to a read-only mode (or a "read-only state"), the RAID-0 system transitions to an operating mode (that may be referred to as "emergency mode") and the volume manager 115 for the array of storage devices 110 (i) allocates a rescue space on each of the remaining, unaffected storage devices 110 (those that remain in a read-write state) for metadata and rescued user data from faulty storage devices 110 and (ii) maintains a mapping table (which may be referred to as an "emergency mapping table"). The rescue space on each storage device 110 may be capable of storing n strips, where n=R/(strip size), R=C/M, and C is the capacity of each of the storage devices of the array of storage devices 110. The volume manager 115 may be implemented (e.g., in hardware or in software or firmware, or in a combination of hardware, software and firmware) in the host, or in a raid controller of the RAID-0 system (which may, for example, be housed in a separate enclosure from the host). In some embodiments, the volume manager 115 is implemented in an FPGA. The RAID-0 system may be self-contained and may virtualize the array of storage devices 110 so that from the perspective of the host the RAID-0 system operates like a single storage device 110. In general, the volume manager may be a processing circuit (discussed in further detail below) configured (e.g., by suitable software or firmware) to perform the operations described herein as being performed by the volume manager.

Figure 6A:
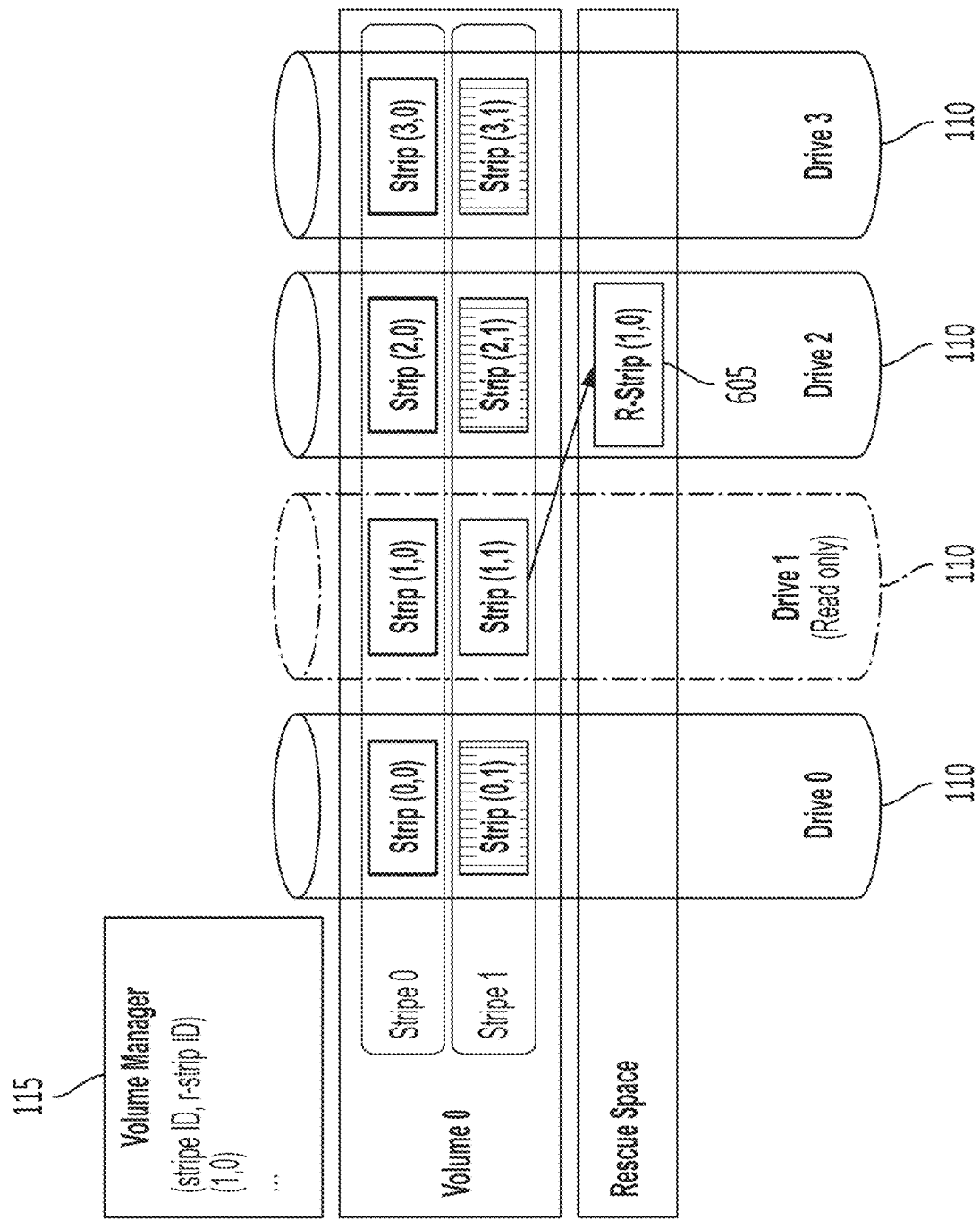
FIG. 6A is a schematic data layout diagram of a RAID-0 system performing a write operation in accordance with example embodiments of the disclosure.

When the RAID-0 system is operating in emergency mode and a write command is received from the host 105, requiring that a stripe be written to the array of storage devices 110, the volume manager 115 checks the emergency mapping table to determine whether a stripe is "registered" i.e., whether an entry has already been made for the stripe. If no entry has been made yet (i.e., if the stripe is "open-mapped", i.e., not registered), the volume manager 115 makes an entry in the emergency mapping table, to indicate where the strip, that ordinarily would have been written to the faulty storage device 110 (the storage device 110 that has transitioned to read-only mode), is to be written. If the emergency mapping table already contains an entry for the stripe, then the entry is used to determine where to write the strip that ordinarily would have been written to the faulty storage device 110. In either case, the volume manager 115 then writes each strip, as illustrated in FIG. 6A, to the array of storage devices 110, writing the strip 605 that ordinarily would have been written to the faulty storage device 110 to rescue space in another storage device 110.

Figure 6B:
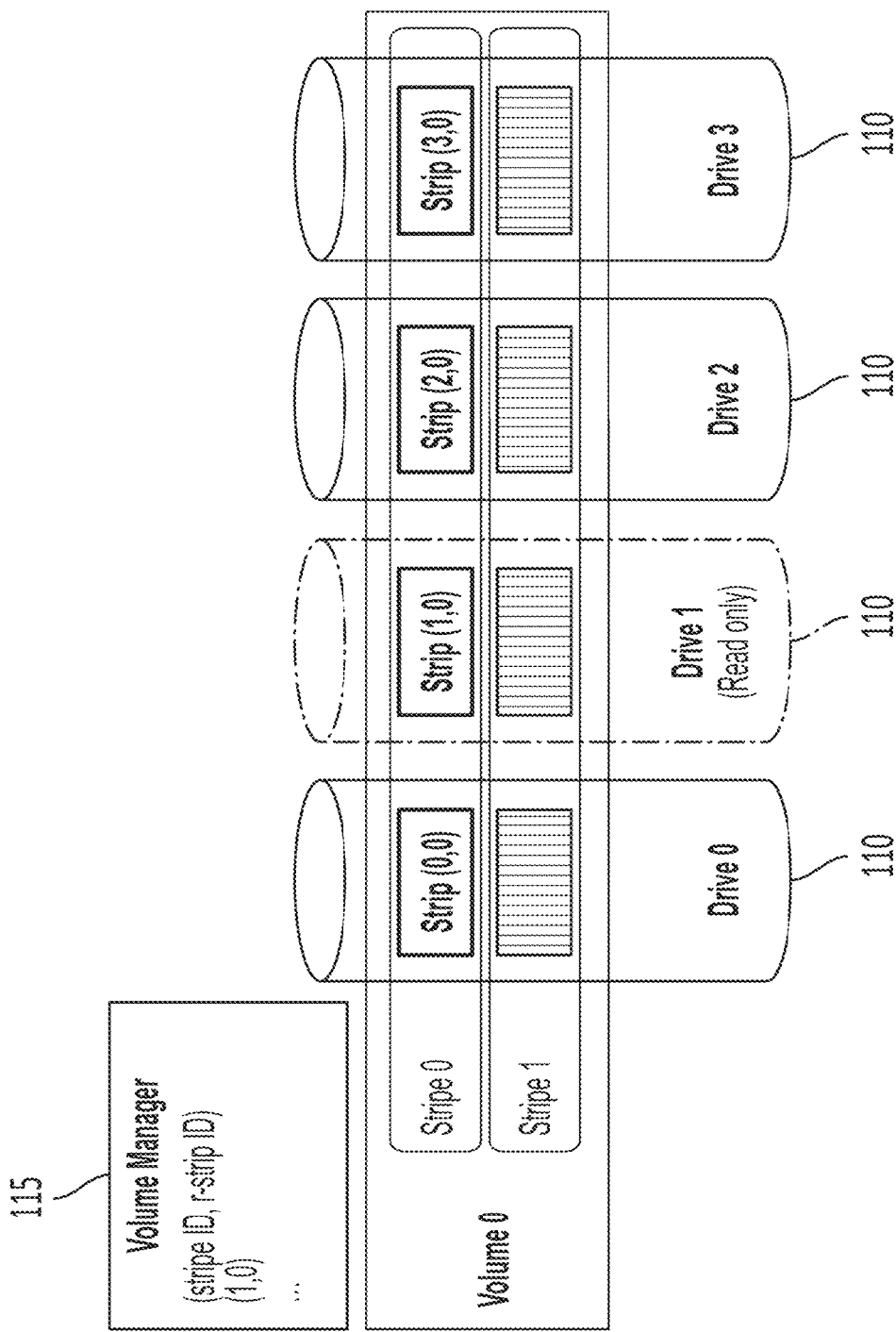
FIG. 6B is a schematic data layout diagram of a RAID-0 system performing a read operation in accordance with example embodiments of the disclosure.

When a read command is received from the host 105, requiring that a stripe be read from the array of storage devices 110, the volume manager 115 checks the emergency mapping table to determine whether an entry has been made for the stripe. If no entry has been made, then, as illustrated in FIG. 6B, the volume manager 115 reads the stripe as it would have, in ordinary operation, reading a strip from each of the storage devices 110, including the faulty storage device 110. If the emergency mapping table contains an entry for the stripe, then the entry is used to determine where to read the strip that ordinarily would have been read from the faulty storage device 110.

The remapping of strips that ordinarily would have been written to the faulty storage device 110 may be accomplished, for example, as follows. Each storage device 110 of the array of storage devices 110 may have a drive identification number (or "drive ID"), which may be a number between zero and M−1, where M is the number of storage devices 110 in the array of storage devices 110. The volume manager 115 may reassign the drive identification numbers, e.g., assign to each storage device 110 of the array of storage devices 110 an alternate drive identification number to be used for performing read or write operations for registered stripes (read operations for unregistered stripes may continue to use the original drive identification numbers). The following formula may be used to generate the alternate drive identification numbers:

If drive ID<faulty drive ID, new drive ID=drive ID

Otherwise, new drive ID=((drive ID−1)+(M−1))mod(M−1)

The effect of this may be (i) to assign, to each storage device having an identification number less than the original drive identification number of the faulty storage device, the respective original drive identification number, and (ii) to assign, to each storage device having an identification number greater than the original drive identification number of the first storage device, the respective original drive identification number less one.

Using the alternate drive numbers, a target drive, to which the strip that ordinarily would have been written to the faulty storage device 110 may be written, may be identified using the formula Target Drive ID=sid % (M−1) where Target Drive ID is the alternate drive identification number of the target drive, sid is the strip identifier of the strip that ordinarily would have been written to the faulty storage device 110, and "%" is the modulo operator.

Figure 6C:
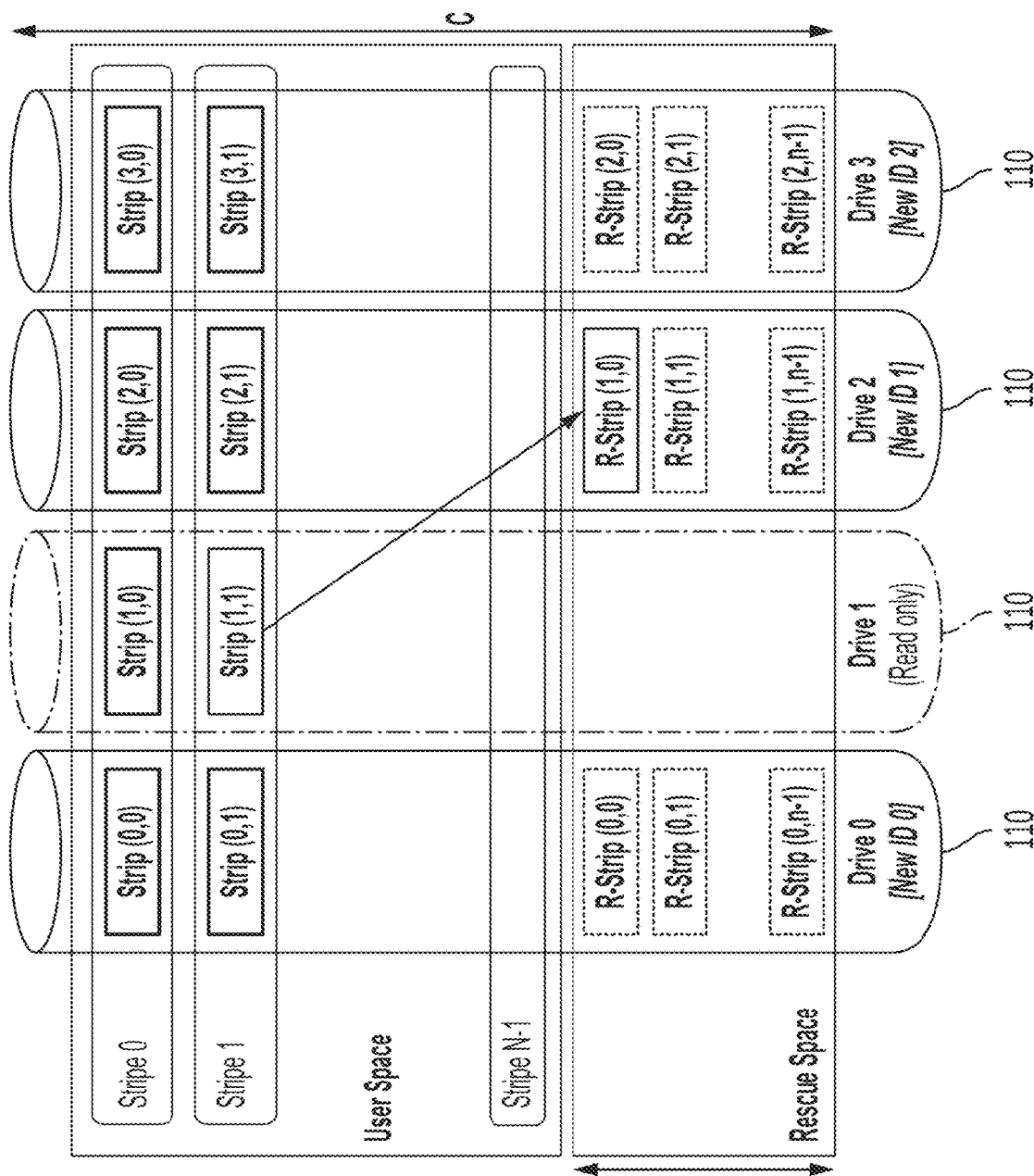
FIG. 6C is a schematic data layout diagram of a RAID-0 system performing a remapping and write operation in accordance with example embodiments of the disclosure.

FIG. 6C is a schematic diagram of a RAID-0 system with four storage devices 110 (i.e., M=4) in which Drive 1 has transitioned to a read-only mode in accordance with example embodiments of the disclosure. When Stripe 1 is written, the target drive ID is implicitly determined by the equation Target Drive ID=Strip ID % (M−1)=1, i.e., the target drive is the storage device 110 with alternate drive identification number 1 (i.e., Drive 2). Within the drive, the rescue space may be split into strips (referred to as "rescue strips", or "R-Strips") the size of which is same as the strip size. The emergency mapping table may contain the entry (1,0) (the first element of which is the stripe ID (Stripe 1), and the second element of which is the R-strip ID on the target drive). As such, the entry (1,0) in the emergency mapping table means that Strip (1,1) is mapped to R-Strip (1,0).

The RAID-0 system may be constructed to accommodate a transition, by one or more of the array of storage devices 110, to either a sustainable read-only mode, or to an unsustainable read-only mode. In the case of a transition to an unsustainable read-only mode, the registered strips of the faulty storage device 110 may be written permanently to a rescue space of another device. In the case of a transition to an unsustainable read-only mode, the volume manager 115 may migrate data from the faulty storage device 110 to unaffected storage devices 110, e.g., at a rate sufficient to move all of the data from the faulty storage device 110 before it expires. The server may calculate this rate based on the amount of data and the time remaining before expiration.

Figure 7A:
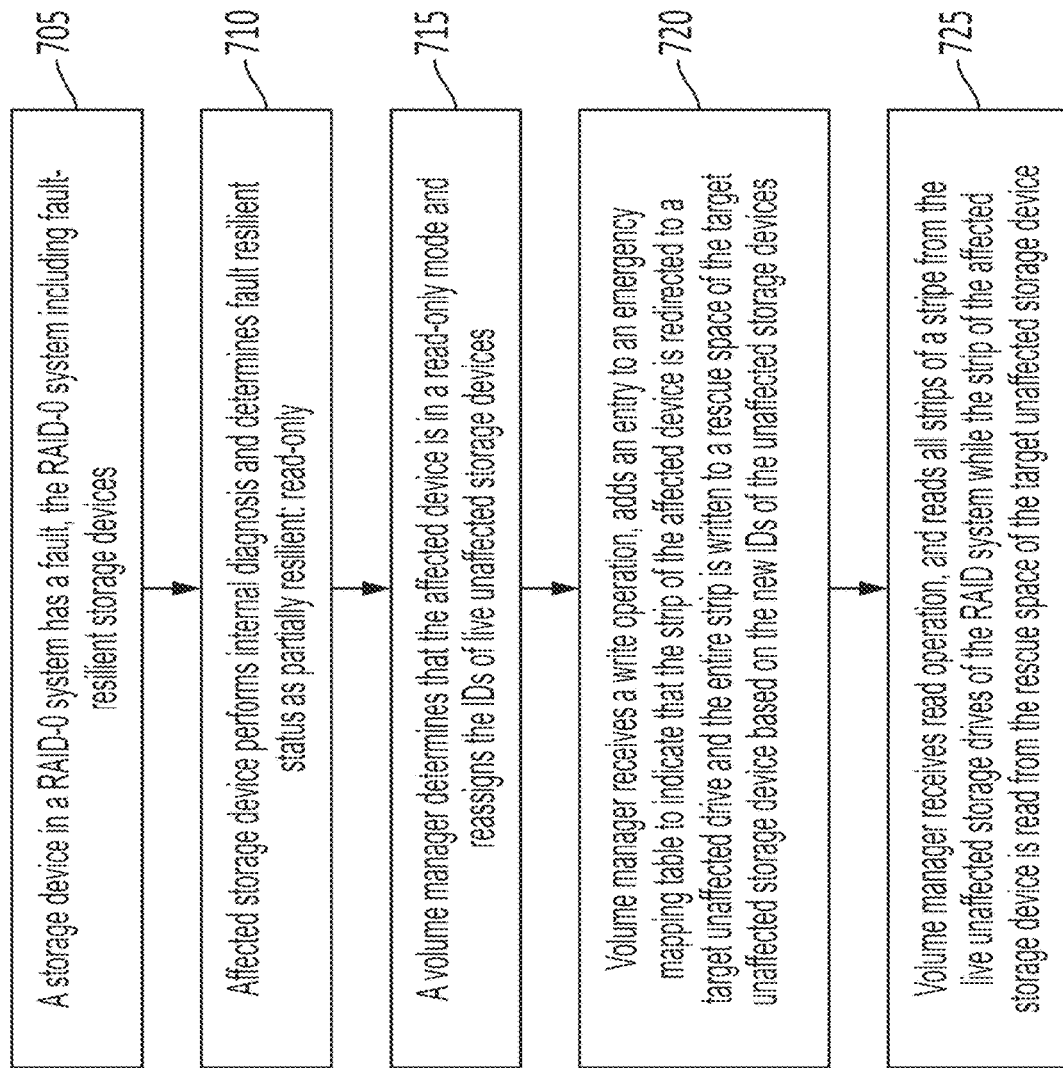
FIG. 7A is a flow chart for a first method of operation of a RAID-0 storage system in accordance with example embodiments of the disclosure.

FIG. 7A is a flowchart for a method for operating a RAID-0 system in accordance with example embodiments of the disclosure. At 705, A storage device 110 in a RAID-0 system has a fault and transitions to a read-only mode; at 710, the affected storage device 110 performs an internal diagnosis and determines that its fault resilient status is partially resilient and read-only; at 715, the volume manager 115 determines that the affected storage device 110 is in a read-only mode and reassigns the IDs of ("live") unaffected storage devices; at 720, the volume manager 115 receives a write operation, adds an entry to an emergency mapping table to indicate that the strip of the affected device is redirected to a target (unaffected) storage device 110, and the entire strip is written to a rescue space of the target (unaffected) storage device based on the new drive IDs of the unaffected storage devices; and, at 725, the volume manager 115 receives a read command from the host 105, and reads all strips of a stripe from the live unaffected storage devices 110 of the RAID system while the strip of the affected storage device is read from the rescue space of the target (unaffected) storage device.

Figure 7B:
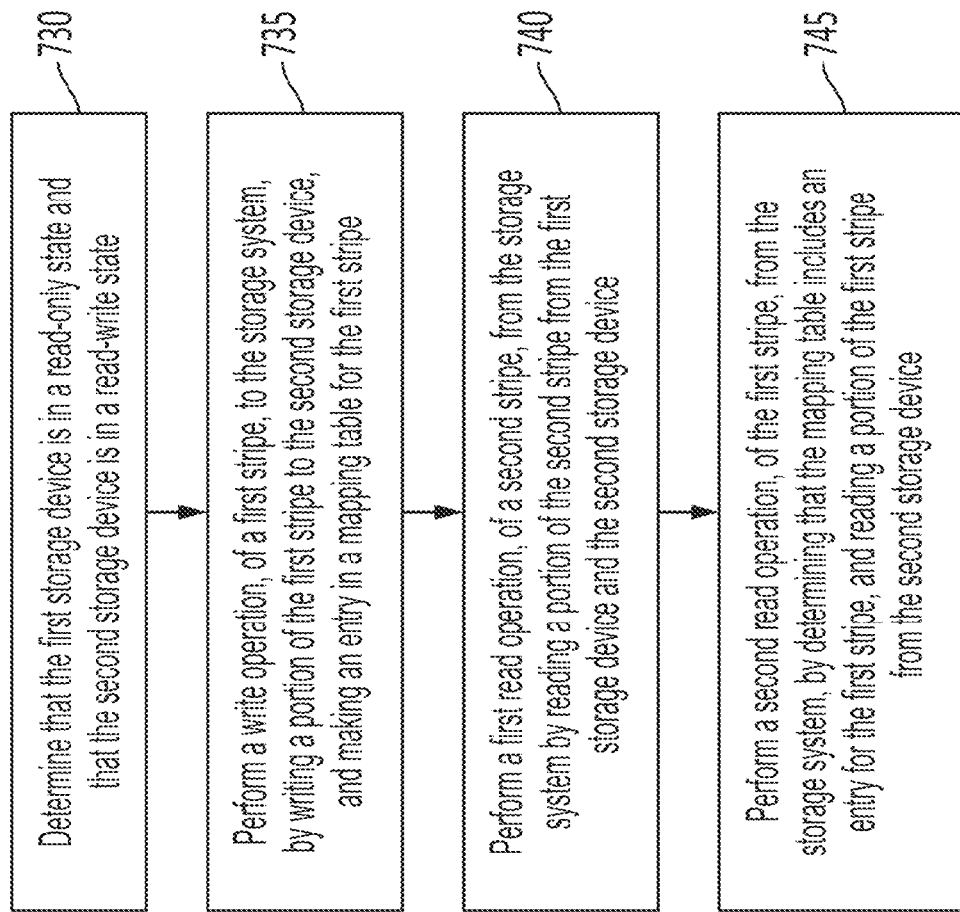
FIG. 7B is a flow chart for a second method of operation of a RAID-0 storage system in accordance with example embodiments of the disclosure.

FIG. 7B is a flow chart showing details of a method for operating a RAID-0 storage system in accordance with example embodiments of the disclosure. The method includes, at 730, determining that the first storage device is in a read-only state and that the second storage device is in a read-write state; at 735, performing a write operation, of a first stripe, to the storage system, by writing a portion of the first stripe to the second storage device, and making an entry in a mapping table for the first stripe; at 740, performing a first read operation, of a second stripe, from the storage system, by reading a portion of the second stripe from the first storage device and the second storage device; and at 745, performing a second read operation, of the first stripe, from the storage system, by determining that the mapping table includes an entry for the first stripe, and reading a portion of the first stripe from the second storage device.

Various elements described herein, such as the host 105 or the controller 120, may be, or may contain, processing circuits. The term "processing circuit" or "means for processing" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example a processing circuit may include two processing circuits, an FPGA and a CPU, interconnected on a PCB.

As used herein, "a portion of" something means "at least some of" the thing, and as such may mean less than all of, or all of, the thing. As such, "a portion of" a thing includes the entire thing as a special case, i.e., the entire thing is an example of a portion of the thing. As used herein, the term "or" should be interpreted as "and/or", such that, for example, "A or B" means any one of "A" or "B" or "A and B".

The background provided in the Background section of the present disclosure section is included only to set context, and the content of this section is not admitted to be prior art. Any of the components or any combination of the components described (e.g., in any system diagrams included herein) may be used to perform one or more of the operations of any flow chart included herein. Further, (i) the operations are example operations, and may involve various additional steps not explicitly covered, and (ii) the temporal order of the operations may be varied.

As used herein, when a method (e.g., an adjustment) or a first quantity (e.g., a first variable) is referred to as being "based on" a second quantity (e.g., a second variable) it means that the second quantity is an input to the method or influences the first quantity, e.g., the second quantity may be an input (e.g., the only input, or one of several inputs) to a function that calculates the first quantity, or the first quantity may be equal to the second quantity, or the first quantity may be the same as (e.g., stored at the same location or locations in memory) as the second quantity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that such spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" or "between 1.0 and 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Some of the principles of this disclosure relate to storage devices that may continue to operate in one or more fault resilient (FR) modes in case of a fault of the storage device. For example, a storage device may continue to operate in a limited manner that may enable a storage system to recover quickly and/or efficiently from the fault of the storage device.

In some embodiments, a storage device operating in one or more fault resilient modes may have at least partial read capability, for example, by operating in a read-only mode.

In some embodiments, a storage device having one or more fault resilient modes with at least partial read capability may be used to implement a recovery scheme for a group of storage devices in which one or more parity spaces may be used as rescue space for a rebuild operation to recover information from a faulty storage device. For example, a group of storage devices may be configured in a redundant array that may appear as a single (in some cases larger) virtual storage device. In the event of a fault of a first storage device having a fault resilient mode with at least partial read capability, the redundant array may implement a rebuild operation in which data from the faulty storage device may be pre-rebuilt in a parity space of a second storage device by copying data from the first storage device to the parity space of the second storage device.

In some embodiments, the group of storage devices may continue to operate indefinitely with at least a portion of the parity space of the second storage device operating as a replacement for at least a portion of the faulty storage device. In such an embodiment, parity may not be implemented for the portion of the first storage device that may be replaced by the portion of the parity space of the second storage device.

In some embodiments, the rebuild operation may continue by copying some or all of the pre-rebuilt data from the parity space of the second storage device to a replacement storage device. The group of storage devices may then return to normal operation, for example, with parity information being calculated for the data recovered from the faulty storage device.

In some embodiments, the storage system may continue read operations from the faulty storage device while pre-rebuilding the data from the faulty storage device to the parity space of the second storage device. If a read operation attempts to read data from the faulty storage device during a rebuild operation, depending on the rebuild point, the data may be read directly from the faulty storage device and/or from a corresponding location in the parity space of the second storage device.

In some embodiments, the storage system may continue write operations intended for the faulty storage device while pre-rebuilding the data from the faulty storage device to the parity space of the second storage device. If a write operation attempts to write data to the faulty storage device during a rebuild operation, the write data may be written instead to a corresponding location in the parity space of the second storage device.

Depending on the implementation details, one or more of these features may reduce I/O operations, parity calculations, and/or the like, and may enable a storage system to quickly recover data, for example, without parity calculations and/or synchronization.

The principles disclosed herein have independent utility and may be embodied individually, and not every embodiment may utilize every principle. However, the principles may also be embodied in various combinations, some of which may amplify the benefits of the individual principles in a synergistic manner.

In some embodiments, a storage system may implement a redundant array of independent drives (RAID) which may appear as a virtual storage device. Some embodiments of RAID storage systems may include parity information which may be used to rebuild data from a failed drive.

Figure 8:
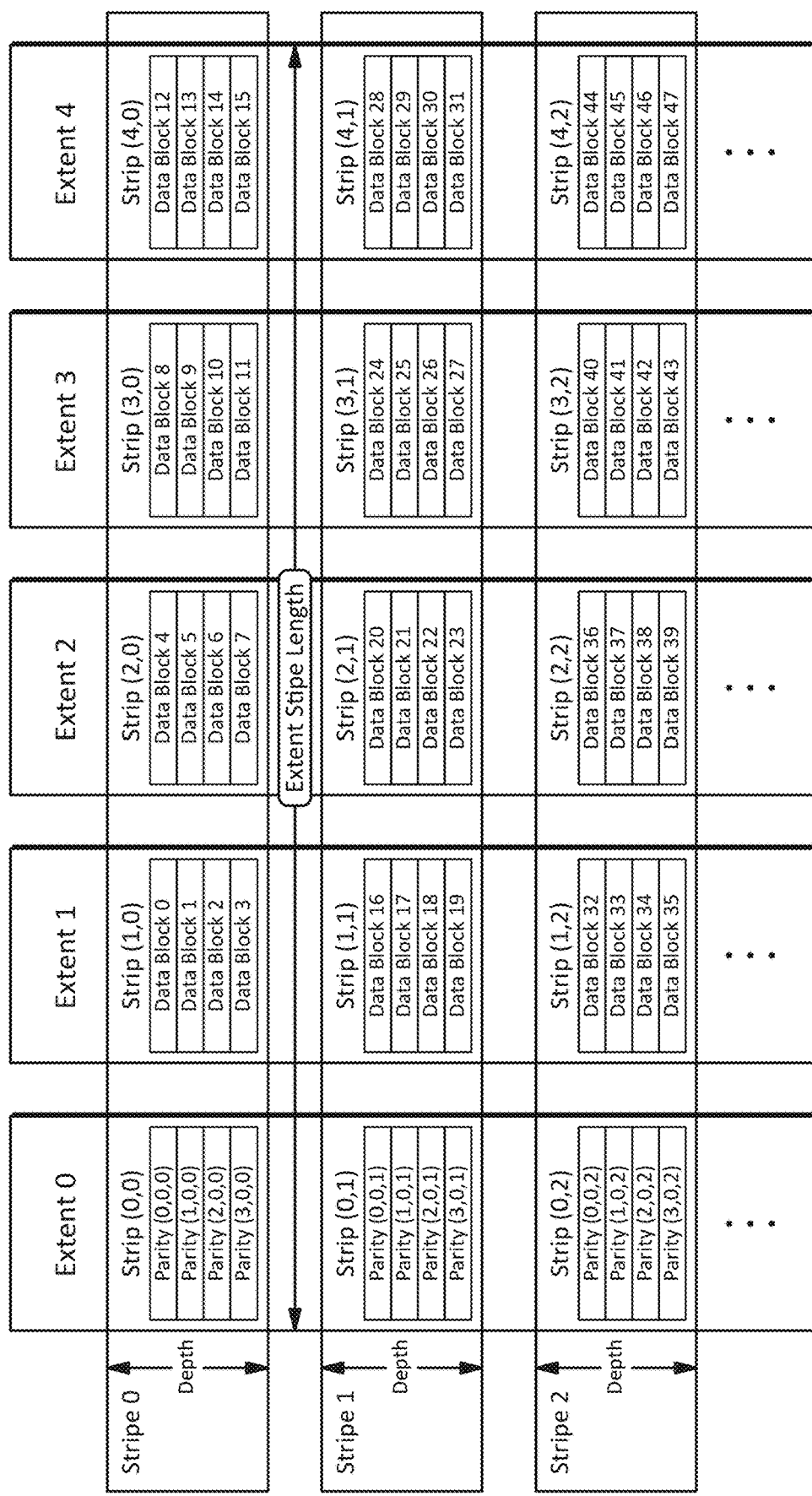
FIG. 8 illustrates an embodiment of a mapping scheme for a RAID-4 storage system in accordance with example embodiments of the disclosure.

FIG. 8 illustrates an embodiment of a mapping scheme for a RAID-4 storage system in accordance with example embodiments of the disclosure. In some embodiments, drives may be divided into contiguous regions of data storage space referred to as extents. In some embodiments, an extent may include the entire drive. Thus, in some embodiments, and in this disclosure, the term extent may be used interchangeably with drive or storage device unless otherwise apparent from context. Each drive may include one or more strips that may collectively form a stripe which may have a stipe length that spans multiple drives. Each strip may be further divided into one or more data blocks. This example may be referred to as having non-rotating parity because the parity blocks may all be stored on a single drive (e.g., in Extent 0).

In the event of a single drive failure, data blocks from the failed drive may be recovered through an exclusive-OR operation of the corresponding parity block and remaining data blocks from the other healthy drives. Alternatively, if the failed drive contained the parity blocks, the parity block may be recalculated through an exclusive-OR operation on the data blocks from the other healthy drives.

Figure 9:
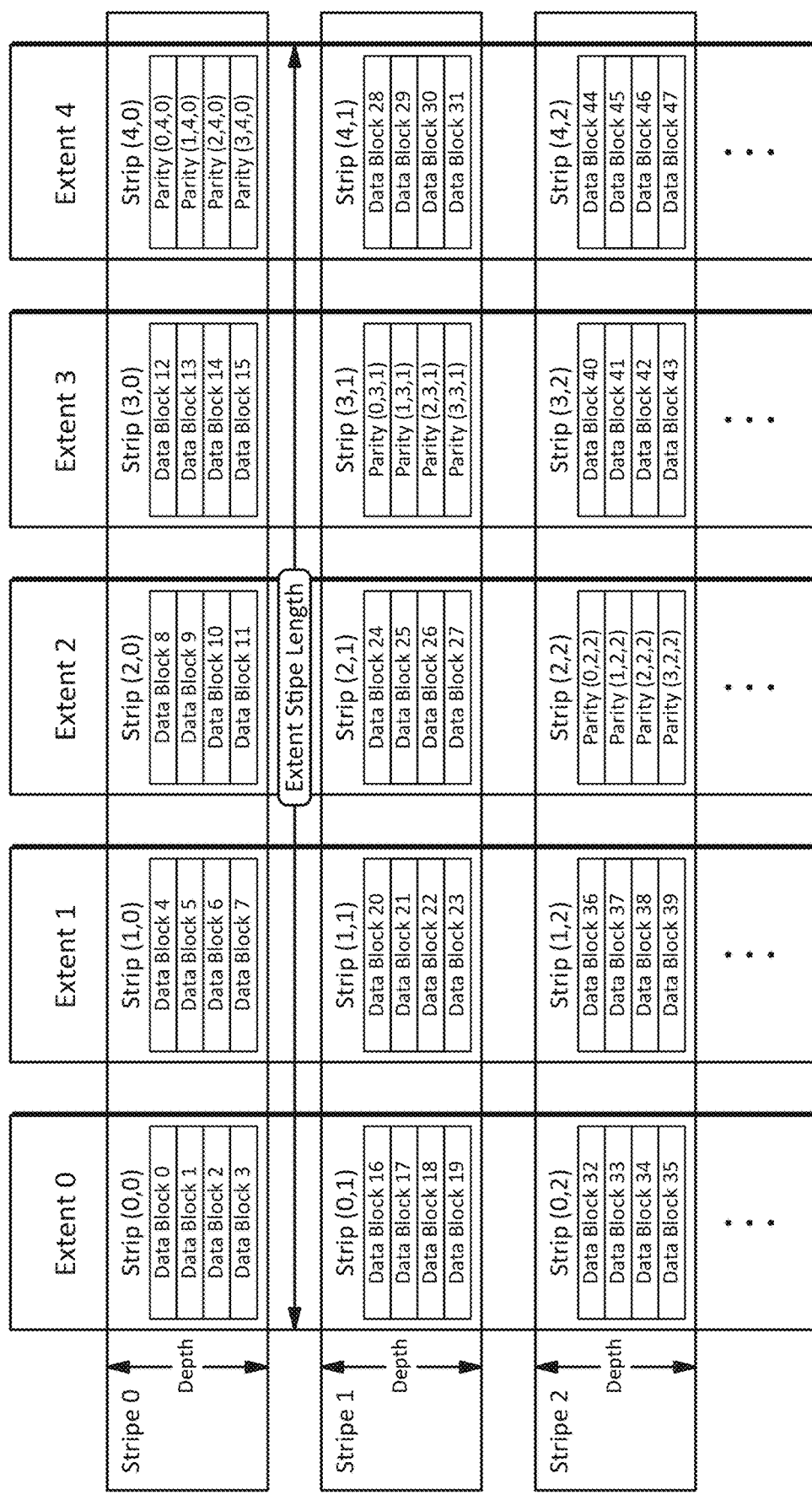
FIG. 9 illustrates an embodiment of a mapping scheme for a RAID-5 storage system in accordance with example embodiments of the disclosure.

FIG. 9 illustrates an embodiment of a mapping scheme for a RAID-5 storage system in accordance with example embodiments of the disclosure. The embodiment illustrated in FIG. 9 may be similar to the embodiment illustrated in FIG. 8, but the embodiment illustrated in FIG. 9 may have rotating parity in which the strip having parity blocks may rotate to different drives for different stripes.

Figure 10A:
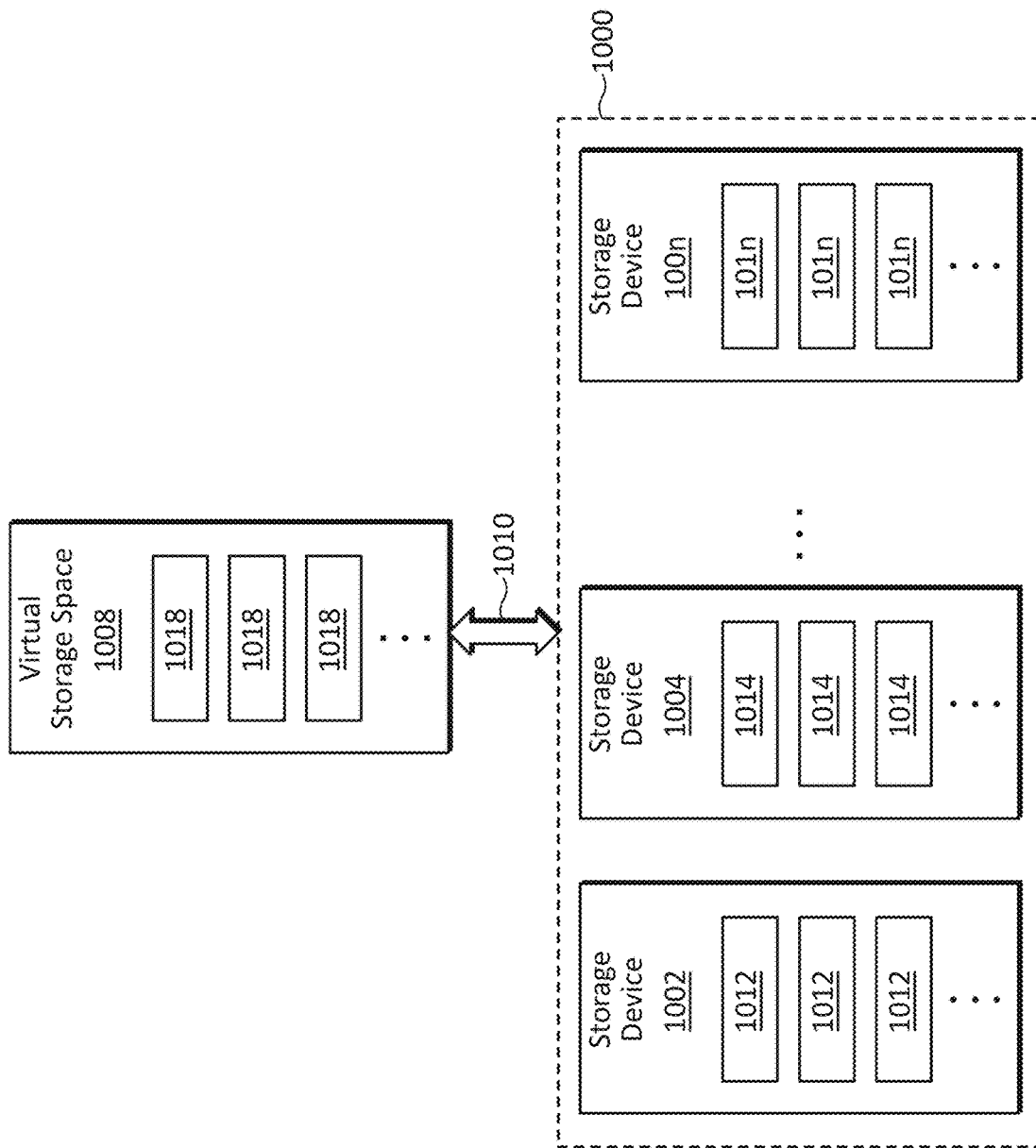
FIG. 10A illustrates an embodiment of a mapping scheme for a redundant array storage system including at least one fault resilient storage device in accordance with example embodiments of the disclosure.

FIG. 10A illustrates an embodiment of a mapping scheme for a redundant array storage system including at least one fault resilient storage device in accordance with example embodiments of the disclosure. The embodiment illustrated in FIG. 10A may include a first storage device 1002 and a second storage device 1004 configured as a redundant array 1000. The redundant array 1000 may be configured to map virtual storage space 1008 to the first and second storage devices 1002 and 1004 using any type of mapping scheme 1010, for example, a mapping scheme including parity information that may be used to rebuild information from a faulty storage device.

The first and second storage devices 1002 and 1004 may include information blocks 1012 and 1014, respectively, one or more of which may be implemented as data blocks that may be mapped to corresponding data blocks 1018 in the virtual storage space 1008. One or more of the information blocks 1012 and 1014 may be implemented as parity bocks that may be used to recover one or more of the information blocks 1012 and 1014 that may be implemented as data blocks.

Some embodiments may further include one or more additional storage devices up to 101n configured as part of the redundant array 1000 as shown by the ellipses in FIG. 10A.

At least one of the first or second storage devices 1002 or 1004 may be implemented as a fault resilient storage device which may be cable of operating in one or more fault resilient modes in which the storage device may continue to operate and retain at least partial read capability despite encountering a fault condition as described in more detail below. For example, in some embodiments, a fault resilient storage device may operate in a read-only mode.

Figure 10B:
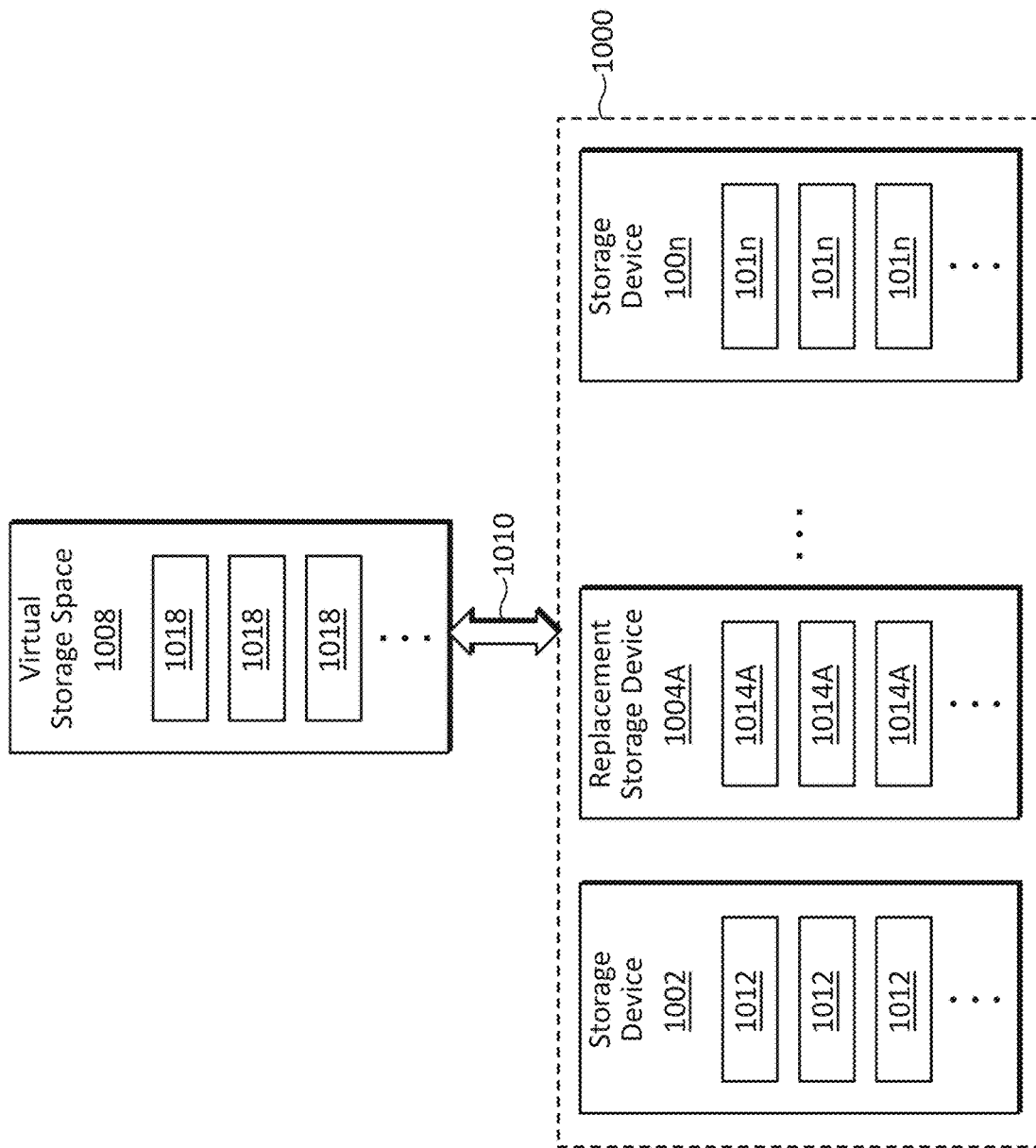
FIG. 10B illustrates an embodiment of a mapping scheme for a redundant array storage system including at least one fault resilient storage device and a replacement storage device in accordance with example embodiments of the disclosure.

The inclusion of a storage device having a fault resilient mode with at least partial read capability may enable the embodiment illustrated in FIG. 10A to implement a recovery scheme in which the storage system may continue to read from the faulty storage device while rebuilding or pre-rebuilding data from the faulty storage device into a parity space on a healthy storage device. In some embodiments, after a pre-rebuild operation, the faulty storage device may be replaced with a replacement storage device 1004A as shown in FIG. 10B, and a rebuild operation may continue by copying the pre-rebuilt data from the parity spaces to one or more information blocks 1014A in the replacement storage device 1004A.

Depending on the implementation details, these features may provide any number of benefits, for example, reducing I/O operations, latency, power consumption for data transfers and/or parity calculations, synchronization, and/or the like. It may also increase system throughput, for example, by freeing up I/O bandwidth that may be used for other operations.

The embodiment illustrated in FIG. 10 may be used to implement a RAID storage system such as a RAID-4 or RAID-5 system, but the principles described herein with respect to FIG. 10 are not limited to RAID storage systems and may be applied to any storage systems having a group of storage devices configured as a redundant array having at least one storage device that may continue to operate and retain at least partial read capability despite encountering a fault condition. Moreover, although the embodiment illustrated in FIG. 10 may be implemented with storage devices 1002 and 1004, the principles may also be applied to extents and/or any other unit of information that may be used to implement a redundant array storage system. Thus, in some embodiments, a storage device may refer to an extent and/or any other unit of information for, or portion of, a storage device.

Figure 11:
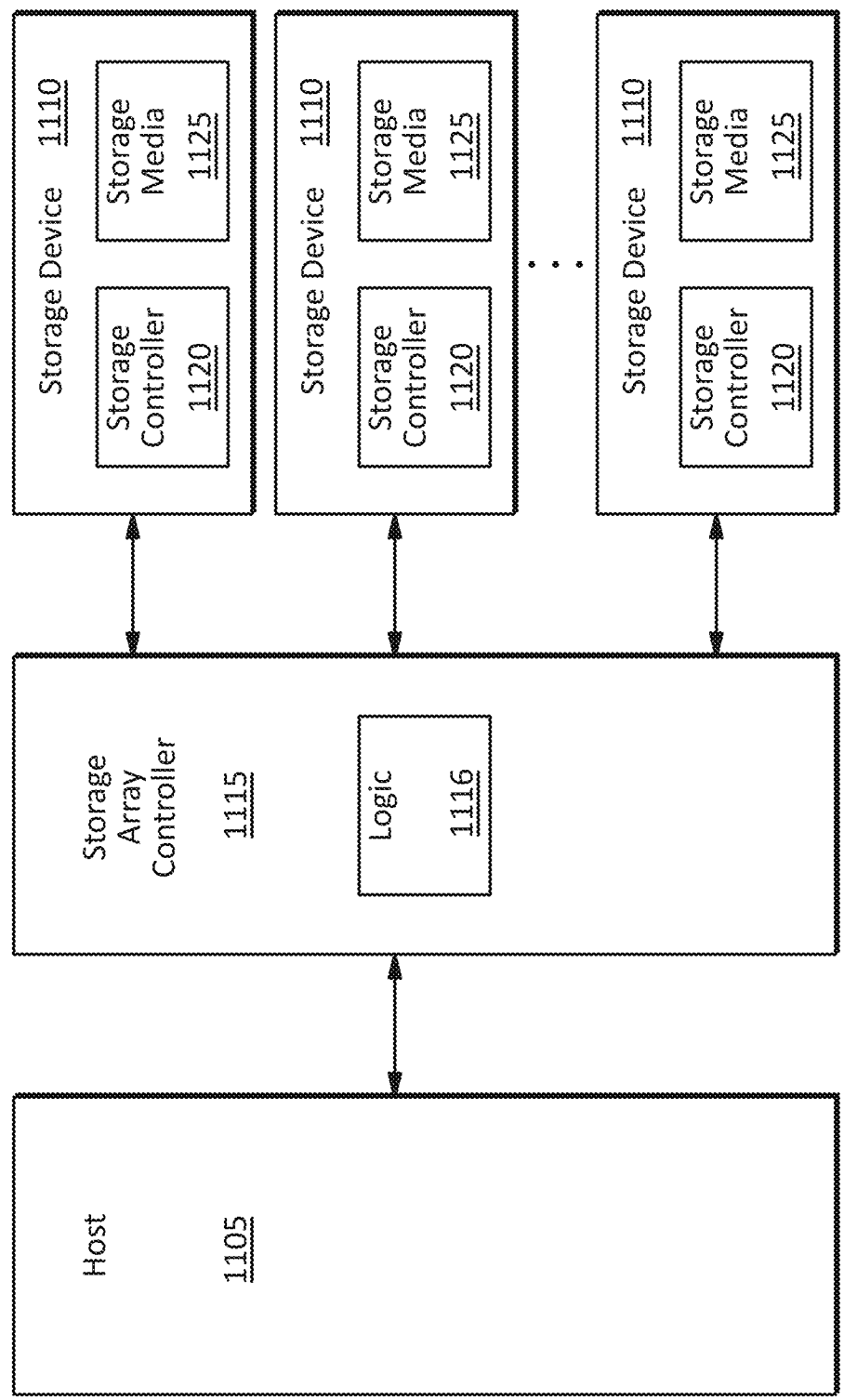
FIG. 11 illustrates an example embodiment of a redundant array storage system in accordance with example embodiments of the disclosure.

FIG. 11 illustrates an example embodiment of a redundant array storage system in accordance with example embodiments of the disclosure. The embodiment illustrated in FIG. 11 may be used, for example, to implement the embodiment illustrated in FIG. 10 and/or any other embodiments disclosed herein.

The embodiment illustrated in FIG. 11 may include a storage array controller 1115 and one or more storage devices 1110. In some embodiments, the storage array controller 1115 may receive read and/or write requests and associated data from a host 1105. Each storage device 1110 may include a storage controller 1120 (which may also be referred to as a control circuit) and storage media 1125. In some embodiments, a storage device 1110 may experience an internal fault condition, and the storage device may exhibit various fault resilient behaviors, as discussed in further detail below, to mitigate the system-level impact of the fault condition.

The storage array controller 1115 may include logic 1116 configured to implement any of the information recovery processes, information rebuilding operations, reading operations, writing operations, parity calculations, and/or any other techniques disclosed herein.

The one or more storage devices 1110 may be implemented with any type of storage apparatus and associated storage media including solid state drives (SSDs), hard disk drives (HDDs), optical drives, drives based on any type of persistent memory such as cross-gridded nonvolatile memory with bulk resistance change, and/or the like, and/or any combination thereof. Data in each storage device may be arranged as blocks, key-value structures, and/or the like, and/or any combination thereof. Each storage device 1110 may have any form factor such as 3.5 inch, 2.5 inch, 1.8 inch, M.2, MO-297, MO-300, Enterprise and Data Center SSD Form Factor (EDSFF) and/or the like, using any connector configuration such as Serial ATA (SATA), Small Computer System Interface (SCSI), Serial Attached SCSI (SAS), U.2, and/or the like, and using any storage interface and/or protocol such as Peripheral Component Interconnect (PCI), PCI express (PCIe), Nonvolatile Memory Express (NVMe), NVMe-over-Fabrics (NVMe-oF), Ethernet, Infini-Band, Fibre Channel, and/or the like. Some embodiments may be implemented entirely or partially with, and/or used in connection with, a server chassis, server rack, dataroom, datacenter, edge datacenter, mobile edge datacenter, and/or any combinations thereof, and/or the like.

Any of the storage controllers 1120, storage array controller 1115, logic 1116, parity logic in embodiments described below, and/or the like may be implemented with hardware, software, or any combination thereof including combinational logic, sequential logic, one or more timers, counters, registers, state machines, complex programmable logic devices (CPLDs), field programmable gate arrays (FPGAs), application specific integrated circuits (ASICs), complex instruction set computer (CISC) processors such as x86 processors and/or reduced instruction set computer (RISC) processors, and/or the like executing instructions stored in volatile memories such as dynamic random access memory (DRAM) and/or static random access memory (SRAM), nonvolatile memory such as flash memory and/or the like, as well as graphics processing units (GPUs), neural processing units (NPUs), and/or the like.

Although the inventive principles are not limited to any particular implementation details, for purposes of illustration, in some embodiments, each storage device 1110 may be implemented as an SSD in which the storage media 1125 may be implemented, for example, with not-AND (NAND) flash memory, and each storage controller 1120 may implement any functionality associated with operating the SSD including a flash translation layer (FTL), a storage interface, and any functionality associated with implementing the fault resilient features disclosed herein. The smallest erasable unit in the storage device 1110 may be referred to as a block and the smallest writeable unit in the storage device 1110 may be referred to as a page.

The storage media 1125 may have a retention period (which may depend on the usage history of the storage media 1125, and, as such, may vary within the storage media 1125). Data that has been stored longer than the retention period (i.e., data having an age exceeding the retention period) may become unreliable and may be said to have expired. Data may be stored in the storage media 1125 using an error correcting code, which may be, e.g., a block code. When data is read from the storage media 1125, a quantity of raw data, referred to as a code block, may be read from the storage media 1125, and an attempt to decode it may be made. If the attempt fails, additional attempts (e.g., read retrials) may be made. With use, a portion, e.g., a block, of the storage media 1125 may degrade to a point that the retention period becomes unacceptably short, and the block may be classified as a bad block. To avoid allowing this circumstance to render the entire storage media 1125 inoperable, reserve space, referred to as bad block management reserve space may be present (e.g., included in each flash memory die or in each flash memory plane), and the controller 1120, or another controller internal to the flash memory die or to the flash memory plane may begin to use a block in the reserve and cease to use the bad block.

The operations and/or components described with respect to the embodiment illustrated in FIGS. 10 and 11, as well as all of the other embodiments described herein, are example operations and/or components. In some embodiments, some operations and/or components may be omitted and/or other operations and/or components may be included. Moreover, in some embodiments, the temporal and/or spatial order of the operations and/or components may be varied. Although some components may be illustrated as individual components, in some embodiments, some components shown separately may be integrated into single components, and/or some components shown as single components may be implemented with multiple components.

For purposes of illustration, some example embodiments of systems, devices, and/or operations may be described below in the context of RAID-5 storage systems. However, the principles are not limited to RAID-5 system and may be applied to other types of RAID systems such as RAID-4, as well as other non-RAID types of redundant array systems in which a group of storage devices may be configured to provide some amount of redundancy regardless of striping, data restarting and/or continuing, rotating and/or non-rotating parity, and/or the like. Moreover, although some embodiments may be illustrated in the context of complete storage devices, the principles may be applied to any portions thereof, including extents and/or any other units of information that may be used to implement a storage array.

Figure 12A:
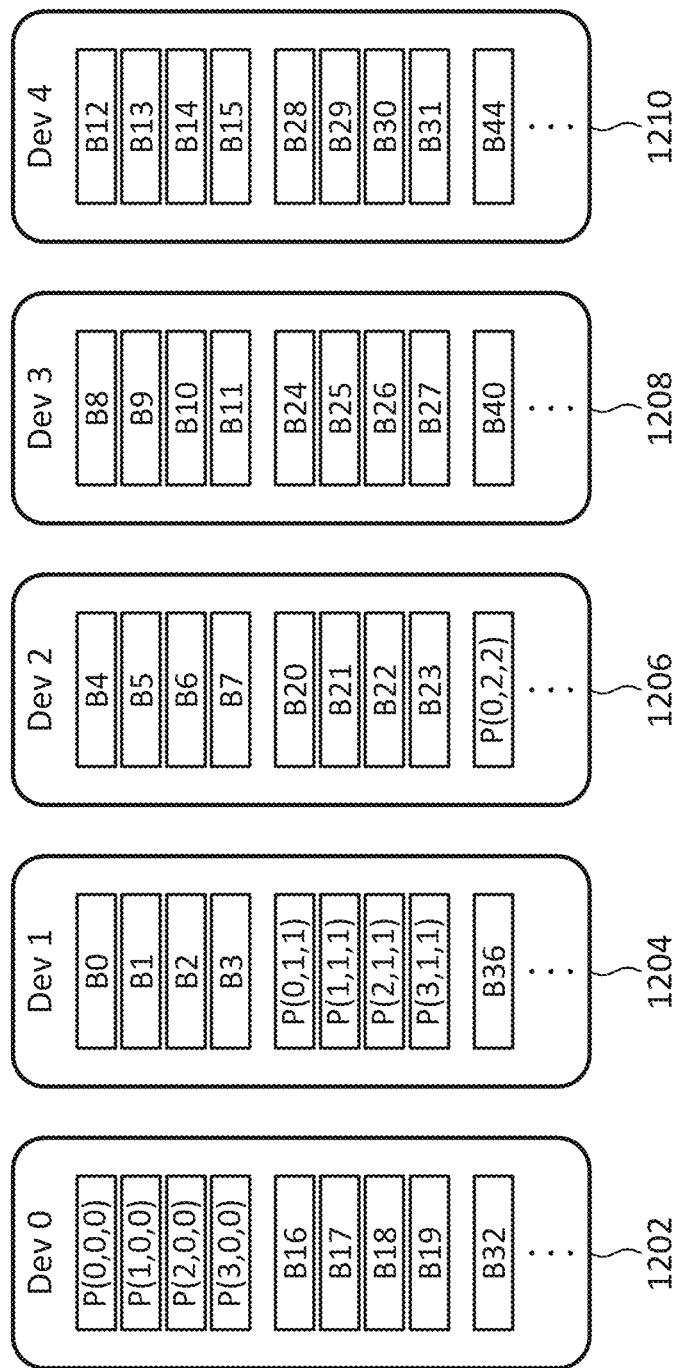
FIG. 12A illustrates an example embodiment of a RAID-5 storage system without a fault resilient storage device in accordance with example embodiments of the disclosure.

FIG. 12A illustrates an example embodiment of a RAID-5 storage system without a fault resilient storage device. In the embodiment illustrated in FIG. 12A, a redundant array may include healthy storage devices 1202, 1204, 1206, 1208, and 1210, The healthy storage devices 1202, 12041206, 1208, and 1210 may be designated as device 0 (Dev 0), device 1 (Dev 1), device 2 (Dev 2), device 3 (Dev 3), and device 4 (Dev 4), respectively.

The top four blocks in storage devices 1202, 1204, 1206, 1208, and 1210 may collectively form a first stripe (Stripe 0). Within Stripe 0, the top four blocks in Dev 0 may contain parity information (e.g., these blocks may be referred to as parity blocks), while the top four blocks in Dev 1 through Dev 4 may contain storage data (e.g., these blocks may be referred to as data blocks).

The next four blocks in storage devices 1202, 1204, 1206, 1208, and 1210 may collectively form a second stripe (Stripe 1). Within Stripe 1, the next four blocks in Dev 1 may be parity blocks, while the next four blocks in Dev 0, and Dev 2 through Dev 4 may be data blocks. Blocks shown at the bottom of storage devices 1202, 1204, 1206, 1208, and 1210, along with additional blocks as indicated by the ellipses, may collectively form additional stripes.

Figure 12B:
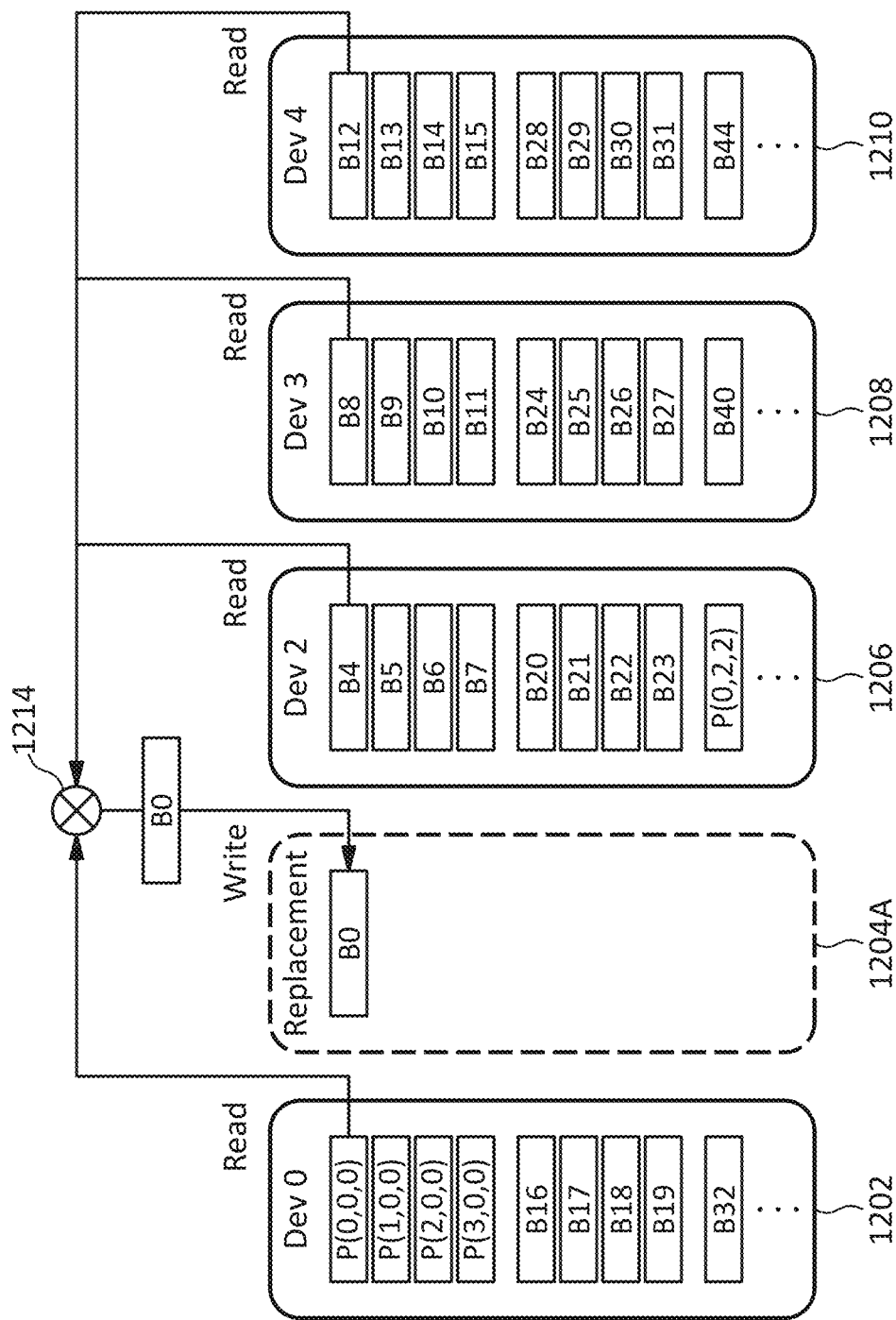
FIG. 12B illustrates the embodiment of FIG. 12A performing a rebuild operation with a replacement storage device in accordance with example embodiments of the disclosure.

FIG. 12B illustrates the embodiment of FIG. 12A performing a rebuild operation with a replacement storage device. In the embodiment illustrated in FIG. 12B, storage device 1204 (Dev 1) may have failed and been replaced with a replacement storage device 1204A. To rebuild data block B0 from the failed storage device 1204 on the replacement storage device 1204A, the system may read parity block P(0,0,0) and data blocks B4, B8, and B12 from healthy storage devices 1202, 1206, 1208, and 1210, respectively, and recover data block B0 by performing a logical exclusive-OR (XOR) operation on parity block P(0,0,0) and data blocks B4, B8, and B12 using parity logic 1214. The recovered data block B0 may then be written to the replacement storage device 1204A. The remaining data blocks B1, B2, and B3 in the first stripe may be recovered in a similar manner.

The system may then proceed to the next stripe and recover the parity block P(0,1,1) by reading data blocks B16, B20, B24, and B28 from healthy storage devices 1202, 1206, 1208, and 1210, respectively, and performing an XOR operation on these data blocks using parity logic 1214. The recovered parity block P(0,1,1) may then be written to the replacement storage device 1204A. The system may proceed through the remainder of the second stripe and any additional stripes to rebuild the remaining data from failed storage device 1204 on the replacement storage device 1204A.

As illustrated in FIG. 126, in some embodiments, recovering a block of data from a faulty storage device may involve reading data and/or parity blocks from multiple storage devices (four in this example) which may increase I/O operations, latency, power consumption for data transfers and/or parity calculations, and/or the like, and may also reduce system throughput, for example, by using I/O bandwidth that may otherwise be used by other I/O operations.

Figure 13A:
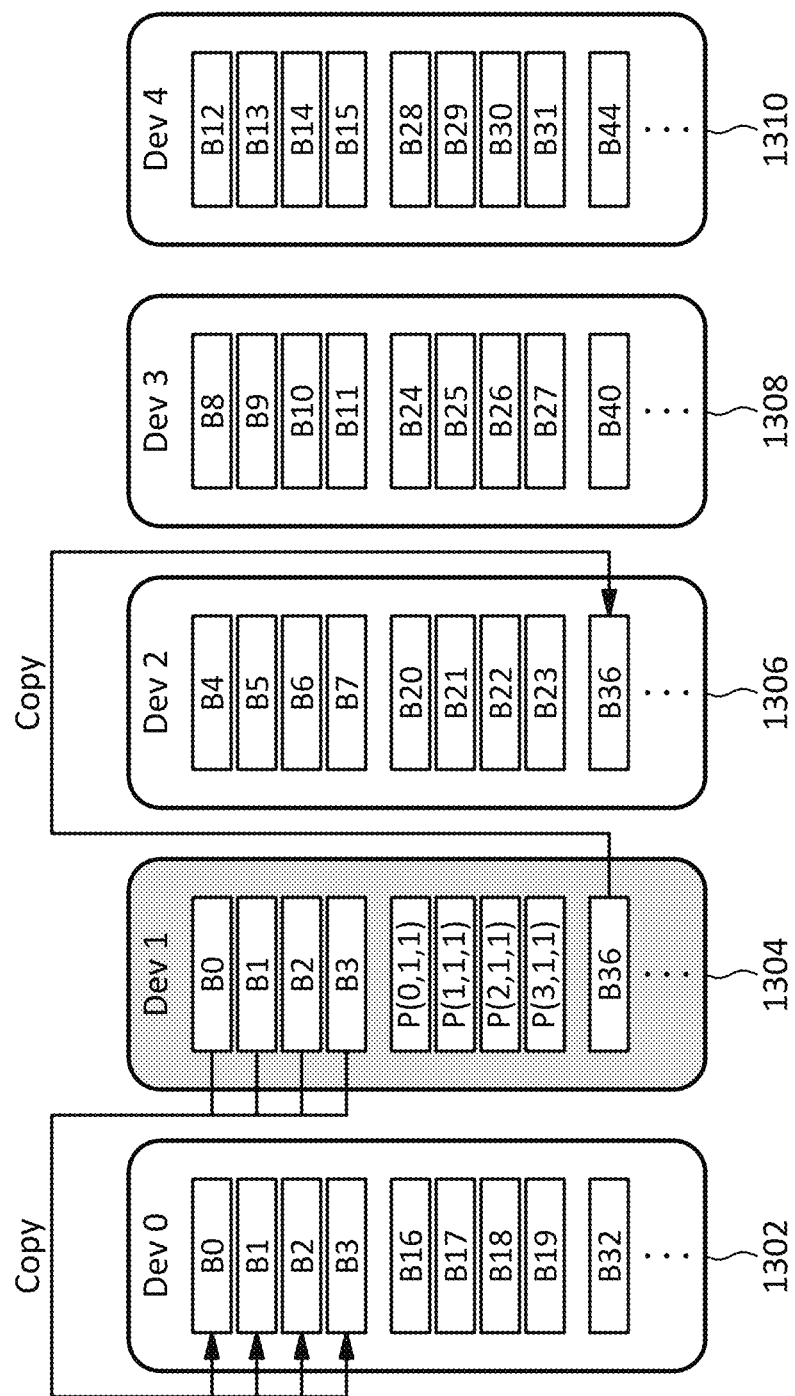
FIG. 13A illustrates an example embodiment of a RAID-5 storage system performing a pre-rebuild operation with a fault resilient storage device in accordance with example embodiments of the disclosure.
Figure 13B:
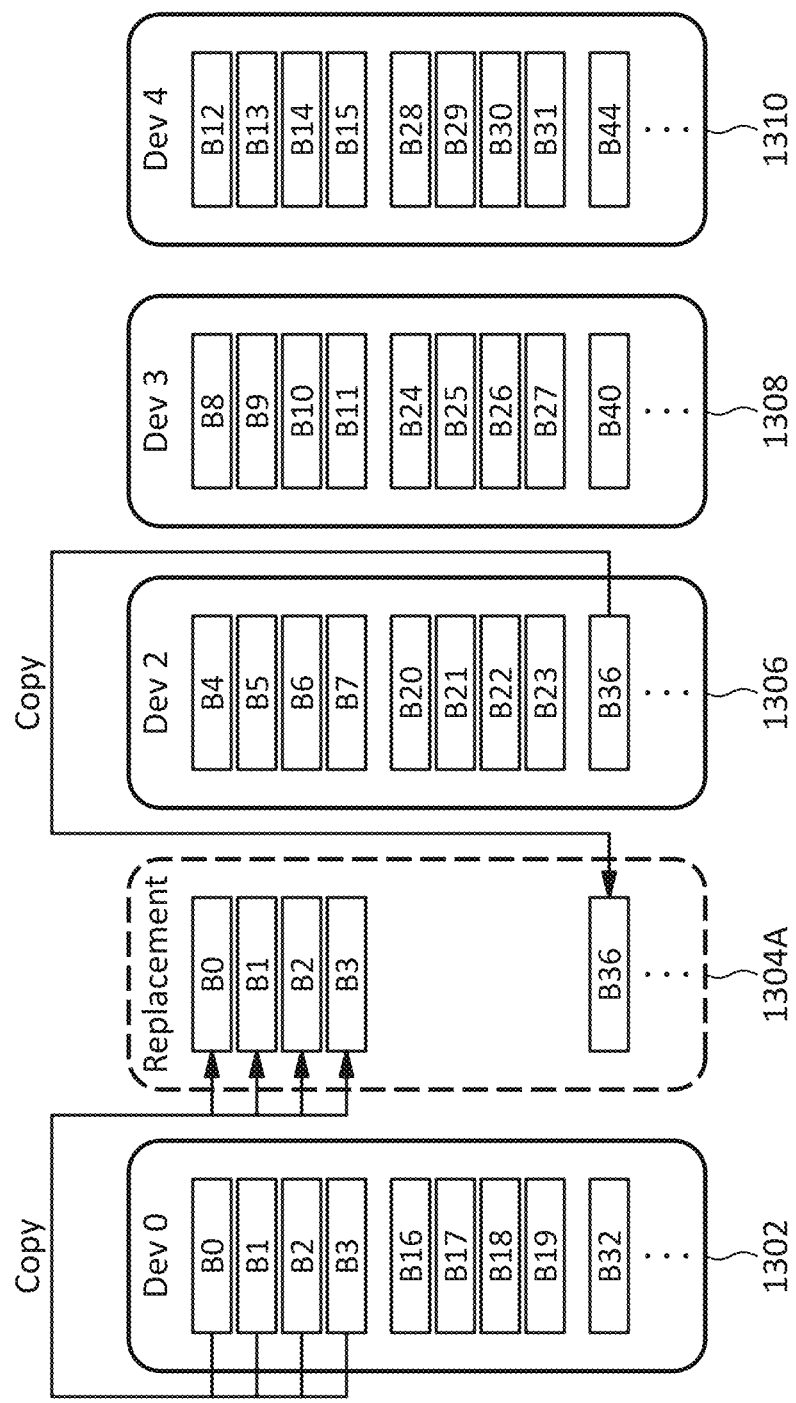
FIG. 13B illustrates an example embodiment of a RAID-5 storage system performing a rebuild operation with a replacement storage device in accordance with example embodiments of the disclosure.

FIGS. 13A and 13B illustrate an example embodiment of a RAID-5 storage system performing a rebuild operation with a fault resilient storage device in accordance with example embodiments of the disclosure. The embodiment illustrated in FIG. 13A may include components similar to those in the embodiment illustrated in FIG. 12A, however, storage device 1304 may be implemented with a fault resilient storage device capable of operating in a fault resilient mode with at least partial read capability in accordance with example embodiments of the disclosure.

In the example embodiment illustrated in FIG. 13A, storage device 1304 may experience a fault (indicated by shading) that may cause it to operate in a read-only mode, for example, by operating in one or more of the fault resilient modes FR_MODE_CAPACITY_READ_ONLY, FR_MODE_PERFORMANCE, FR_MODE_READ_ONLY, and/or FR_MODE_TEMP_READ_ONLY as described below with reference to FIG. 23.

Because the faulty storage device 1304 may operate in a read-only mode, the system illustrated in FIG. 13A may perform a pre-rebuild operation by copying data blocks B0, B1, B2, and B3 in the first stripe from the faulty storage device 1304 to parity space on healthy storage device 1302. The pre-rebuild operation may also copy data blocks beginning with B36 in the third stripe to parity space on healthy storage device 1306. Data blocks in any additional stripes may be copied to other parity spaces on any healthy storage devices.

In some embodiments, after copying some or all of the data from the faulty storage device 1304 to parity space on healthy storage devices, the system may operate indefinitely or temporarily without replacing the faulty storage device 1304, for example, by operating without parity information. In such an embodiment, the system may essentially operate in a RAID-0 configuration. Thus, depending on the implementation details, the use of a fault resilient storage device 1304 and parity space for a rebuild operation may enable a storage system to return to operation quickly after a storage device fault. In some embodiments, data may be copied from the faulty storage device 1304 to the parity space of the healthy storage devices in a batch mode which may increase efficiency.

In some embodiments, after copying some or all of the data from the faulty storage device 1304 to parity space on healthy storage devices, the faulty storage device 1304 may be replaced by a healthy replacement storage device 1304A as illustrated by the dashed outline in FIG. 13B. The system may then continue the data rebuilding operation by copying the pre-rebuilt data (e.g., B0, B1, B2, B3, B36, etc.) from parity space in the healthy storage devices to the replacement storage device 1304A as illustrated in FIG. 13B. In some embodiments, pre-built data may be copied from the healthy storage devices to the replacement storage device 1304A in a batch mode which may increase efficiency.

To return to RAID-5 operation, the system may perform parity calculations to rebuild the parity blocks (e.g., P(0,1,1), P(1,1,1), P(2,1,1), and P(3,1,1) in the first stripe) in the replacement storage device 1304A. The parity calculations may be performed in various ways in accordance with example embodiments of the disclosure. For example, in some embodiments, some or all parity calculations may be performed for each data block as it is copied. Alternatively or additionally, some or all parity calculations may be performed after the copying operations are completed. In some embodiments, some or all parity calculations may be performed in a centralized manner, for example, by a storage server. Alternatively or additionally, some or all parity calculations may be performed in a distributed manner by individual storage devices, for example, if the storage devices have peer-to-peer (P2P) communications and/or parity calculation capabilities.

Figure 13C:
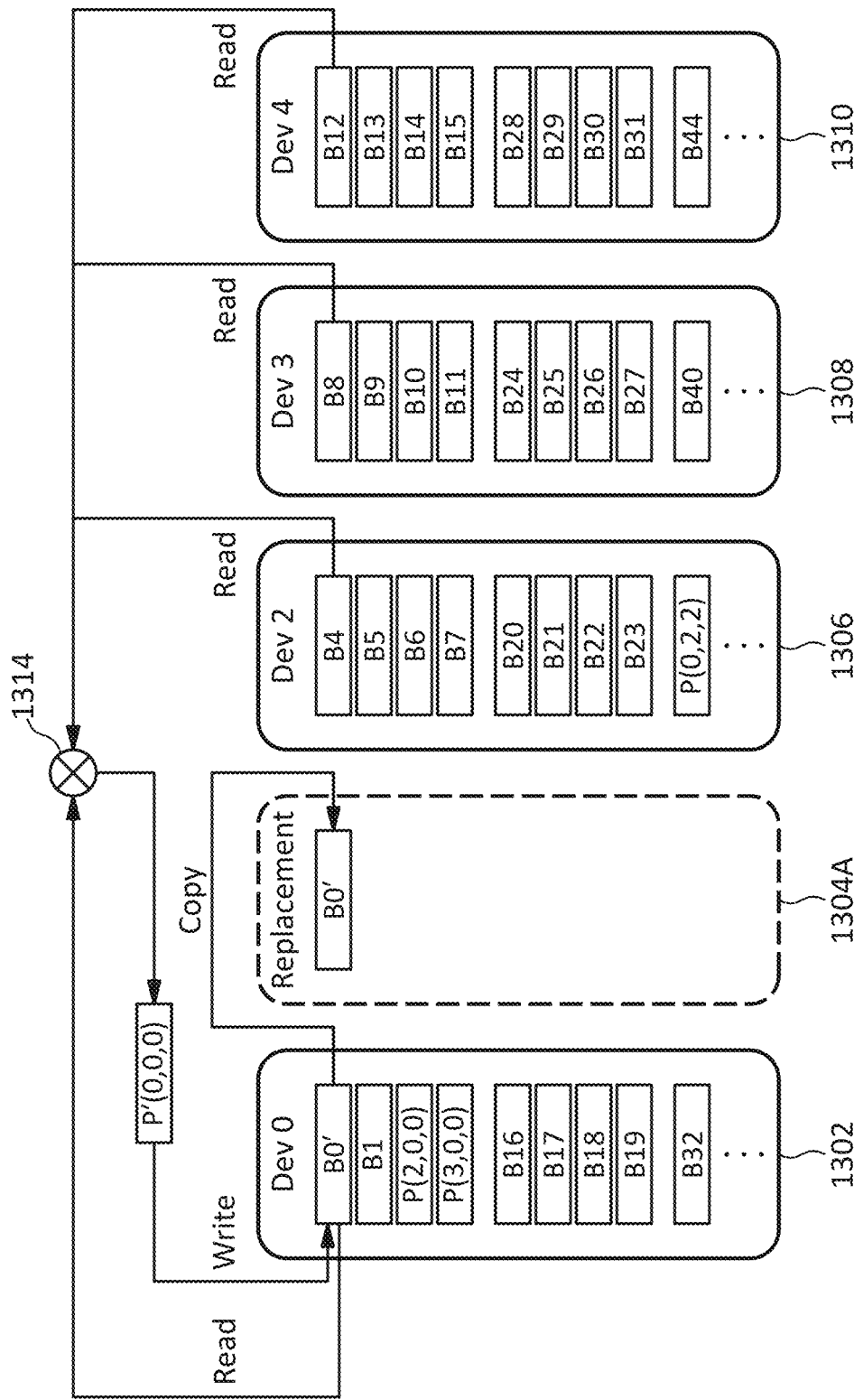
FIG. 13C illustrates another example embodiment of a RAID-5 storage system performing a rebuild operation after replacing a fault resilient storage device that experienced a fault condition with a replacement storage device in accordance with example embodiments of the disclosure.

FIG. 13C illustrates another example embodiment of a RAID-5 storage system performing a rebuild operation after replacing a fault resilient storage device that experienced a fault condition with a replacement storage device in accordance with example embodiments of the disclosure. The embodiment illustrated in FIG. 13C may include components similar to those in the embodiment illustrated in FIG. 12B, however, the faulty storage device that was replaced by replacement storage device 1304A may have been a fault resilient storage device capable of operating in a fault resilient mode with at least partial read capability in accordance with example embodiments of the disclosure.

Prior to replacement, data blocks B0 and B1 may have been pre-rebuilt by copying them from the fault resilient storage device (operating, for example, in a read-only mode) to the parity space in healthy storage device 1302. At some point after the fault resilient storage device experienced a fault condition, data block B0 may have been updated to data block B0' during a write operation by writing the updated data block B0' to a corresponding location in the parity space in healthy storage device 1302 as described below with respect to FIG. 21.

After replacing the faulty fault resilient storage device with replacement storage device 1304A, the rebuild operation may continue by copying the updated data block B0' to the replacement storage device 1304A as shown in FIG. 13C. In some embodiments, parity logic 1314 may perform a parity calculation on the updated data block B0', and data blocks B4, B8, and B12 which may be read from healthy storage devices 1306, 1308, and 1310, respectively, to generate updated parity block P'(0,0,0) which may be written to healthy storage device 1302.

Figure 14:
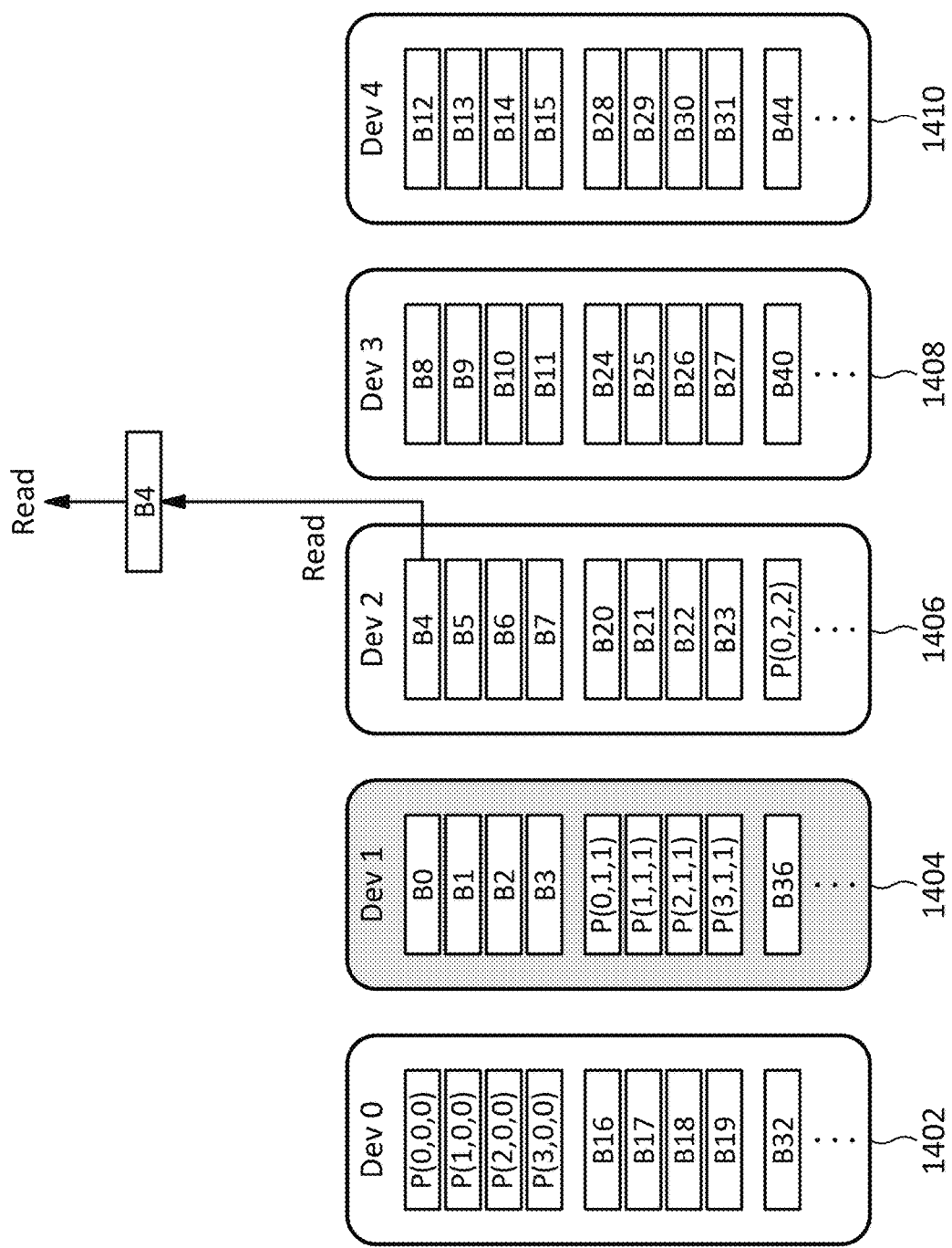
FIG. 14 illustrates an example embodiment of a read operation performed by a RAID-5 storage system without a fault resilient storage device in the event of a failure of a single storage device in accordance with example embodiments of the disclosure.
Figure 15:
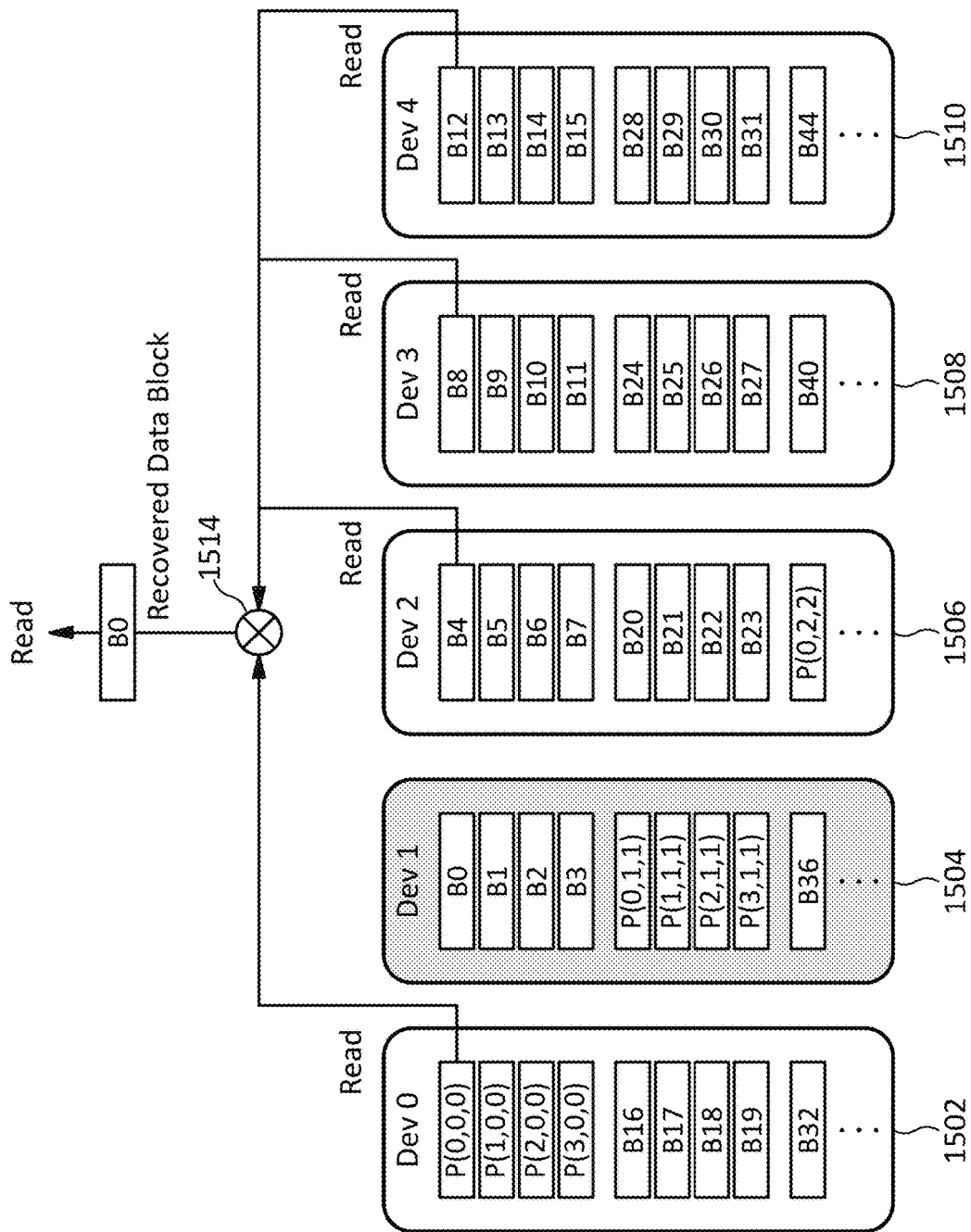
FIG. 15 illustrates an example embodiment of a read operation performed by a RAID 5 storage system without a fault resilient storage device in the event of a failure of a single storage device in accordance with example embodiments of the disclosure.

FIGS. 14 and 15 illustrate some example embodiments of read operations performed by a RAID-5 storage system without a fault resilient storage device in the event of a failure of a single storage device in accordance with example embodiments of the disclosure. The embodiments illustrated in FIGS. 14 and 15 may include components similar to those in the embodiment illustrated in FIG. 12A. In the embodiments illustrated in FIGS. 14 and 15, storage devices 1404 and 1504 may experience fault conditions that may render them incapable of performing read operations.

In the embodiment illustrated in FIG. 14, data block B4 may be read without performing a recovery operation because it may be located on healthy storage device 1406.

In the embodiment illustrated in FIG. 15, data block B0 may be located on faulty storage device 1504. Therefore, to read data block B0, parity block P(0,0,0) and data blocks B4, B8, and B12 may be read from healthy storage devices 1502, 1506, 1508, and 1510, respectively, and processed by parity logic 1514 to recover data block B0. Thus, recovering a block of data from a faulty storage device may involve reading data and/or parity blocks from multiple storage devices (four in this example) which may increase I/O operations, latency, power consumption for data transfers and/or parity calculations, and/or the like, and may also reduce system throughput, for example, by using I/O bandwidth that may otherwise be used by other I/O operations.

Figure 16:
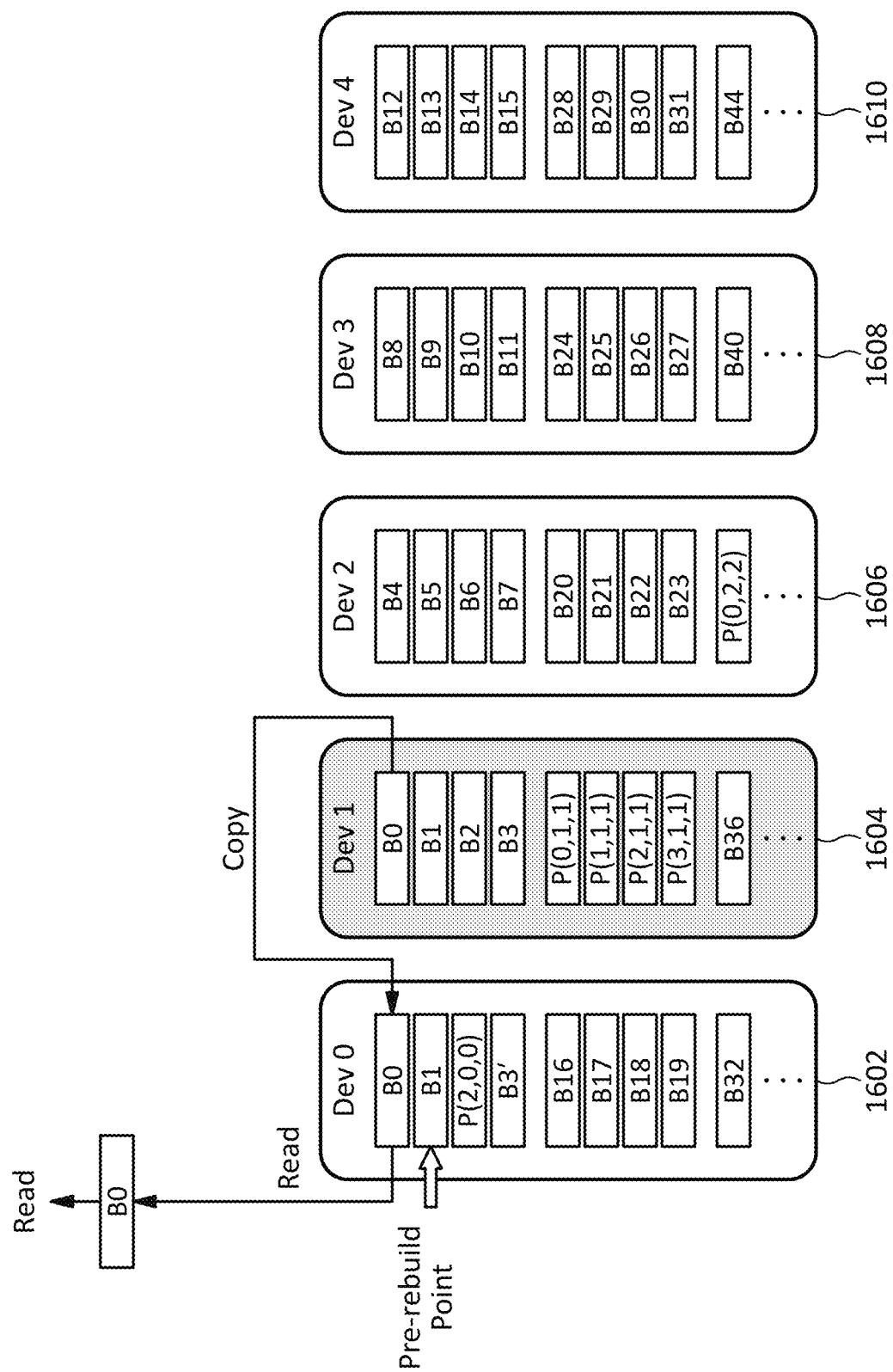
FIG. 16 illustrates an example embodiment of a read operation performed by a RAID 5 storage system having a fault resilient storage device during a rebuild operation in accordance with example embodiments of the disclosure.
Figure 17:
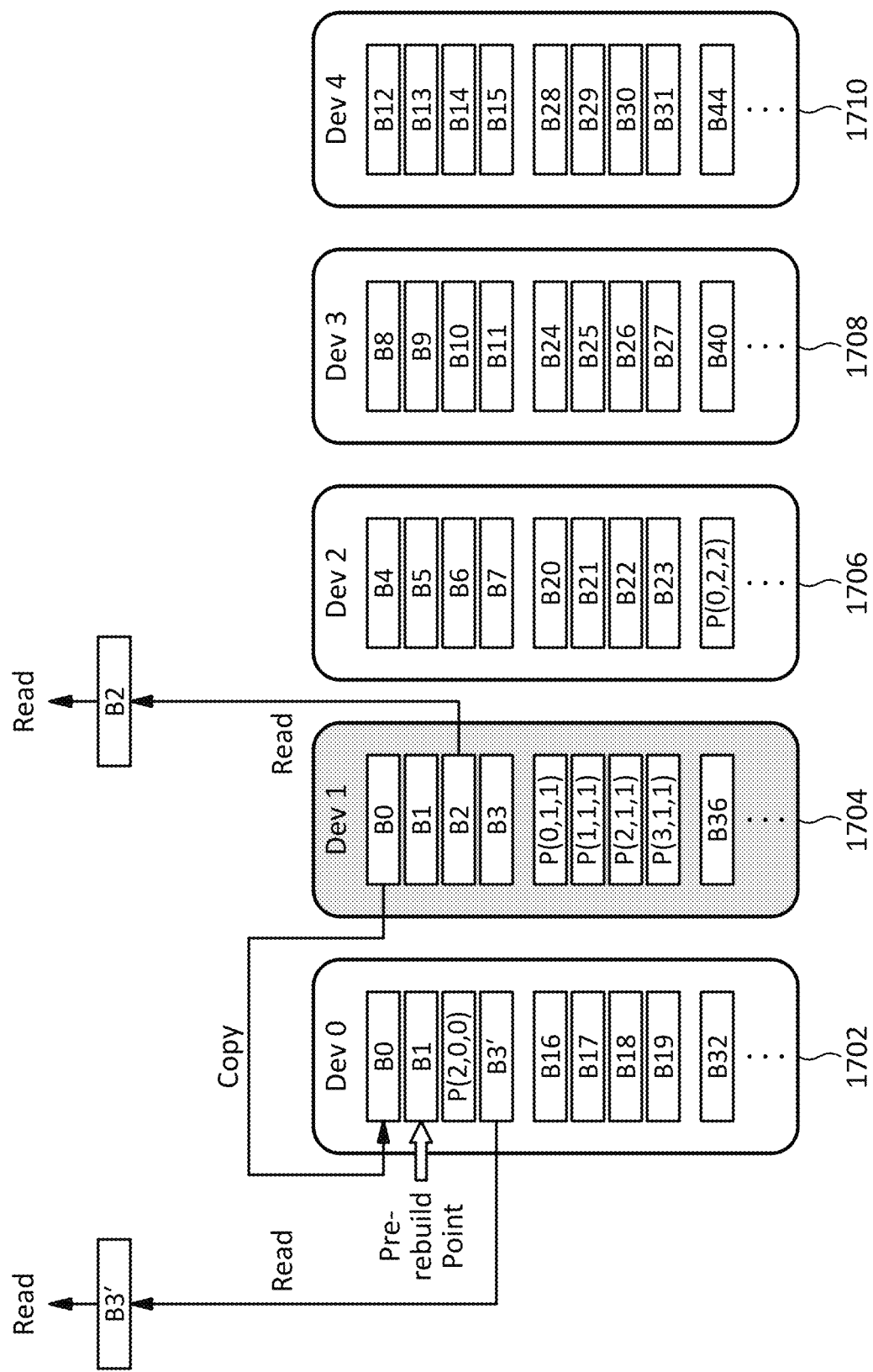
FIG. 17 illustrates example embodiments of read operations performed by a RAID 5 storage system having a fault resilient storage device during a rebuild operation in accordance with example embodiments of the disclosure.

FIGS. 16 and 17 illustrate example embodiments of read operations performed by a RAID 5 storage system having a fault resilient storage device during a rebuild operation in accordance with example embodiments of the disclosure. The embodiments of the storage systems illustrated in FIGS. 16 and 17 may include components similar to those in the embodiment illustrated in FIG. 12A, however the faulty storage devices 1604 and 1704 may be implemented with storage devices capable of operating in a fault resilient mode with at least partial read capability in accordance with example embodiments of the disclosure.

In the example embodiments illustrated in FIGS. 16 and 17, the faulty storage devices 1604 and 1704 may operate in a read-only mode, for example, by operating in one or more of the fault resilient modes FR_MODE_CAPACITY_READ_ONLY, FR_MODE_PERFORMANCE, FR_MODE_READ_ONLY, and/or FR_MODE_TEMP_READ_ONLY as described below with reference to FIG. 23.

In the embodiments illustrated in FIGS. 16 and 17, the system may be in the process of pre-rebuilding data from the faulty storage devices 1604 and 1704 by copying it to the parity space of healthy storage devices 1602 and 1702, respectively, as the pre-rebuild point progresses downward. If a block of data to be read is located on a healthy storage device, it may be read in a manner similar to that illustrated in FIG. 14. However, if a block of data to be read is located on the faulty storage devices 1604 and 1704, depending on the implementation details, it may be recovered quickly without a parity calculation and/or synchronization as illustrated in FIGS. 16 and 17.

In the embodiment illustrated in FIG. 16, a data block to be read (e.g., data block B0) may be located in a portion of the parity space that may have already been pre-rebuilt. Thus, it may be read from the corresponding location in the parity space of healthy storage device 1602.

In the embodiment illustrated in FIG. 17, data block B2 may be located in a portion of the faulty storage device 1704 that may not have been pre-rebuilt yet in the parity space of healthy storage device 1702. However, because the faulty storage device 1704 may be capable of operating in a read-only mode, data block B2 may be read directly from the faulty storage device 1704.

Data block B3 may also be located in a portion of the faulty storage device 1704 that may not have been pre-rebuilt in the parity space of healthy storage device 1702 yet. However, data block B3 may have been updated to data block B3' at the corresponding location in the parity space of healthy storage device 1702 by a write operation such as that described below with respect to FIG. 21. Therefore, updated data block B3' may be read from the healthy storage device 1702.

In some embodiments, and depending on the implementation details, the embodiments illustrated in FIGS. 16 and 17 may reduce I/O operations, latency, power consumption for data transfers and/or parity calculations, synchronization, and/or the like, and may also increase system throughput, for example, by freeing up I/O bandwidth that may be used for other I/O operations.

Figure 18:
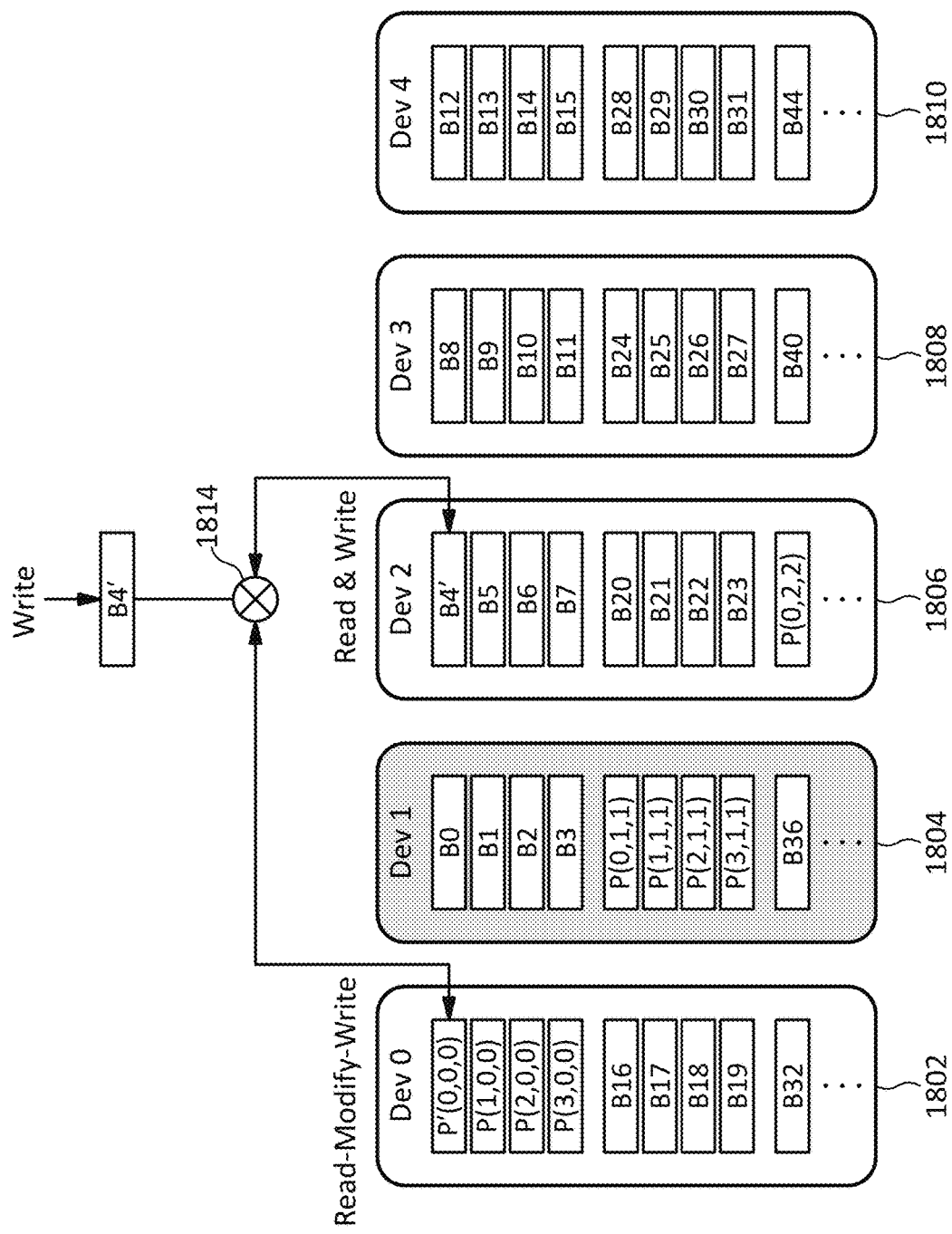
FIG. 18 illustrates an example embodiment of a write operation performed by a RAID-5 storage system without a fault resilient storage device in accordance with example embodiments of the disclosure.
Figure 19:
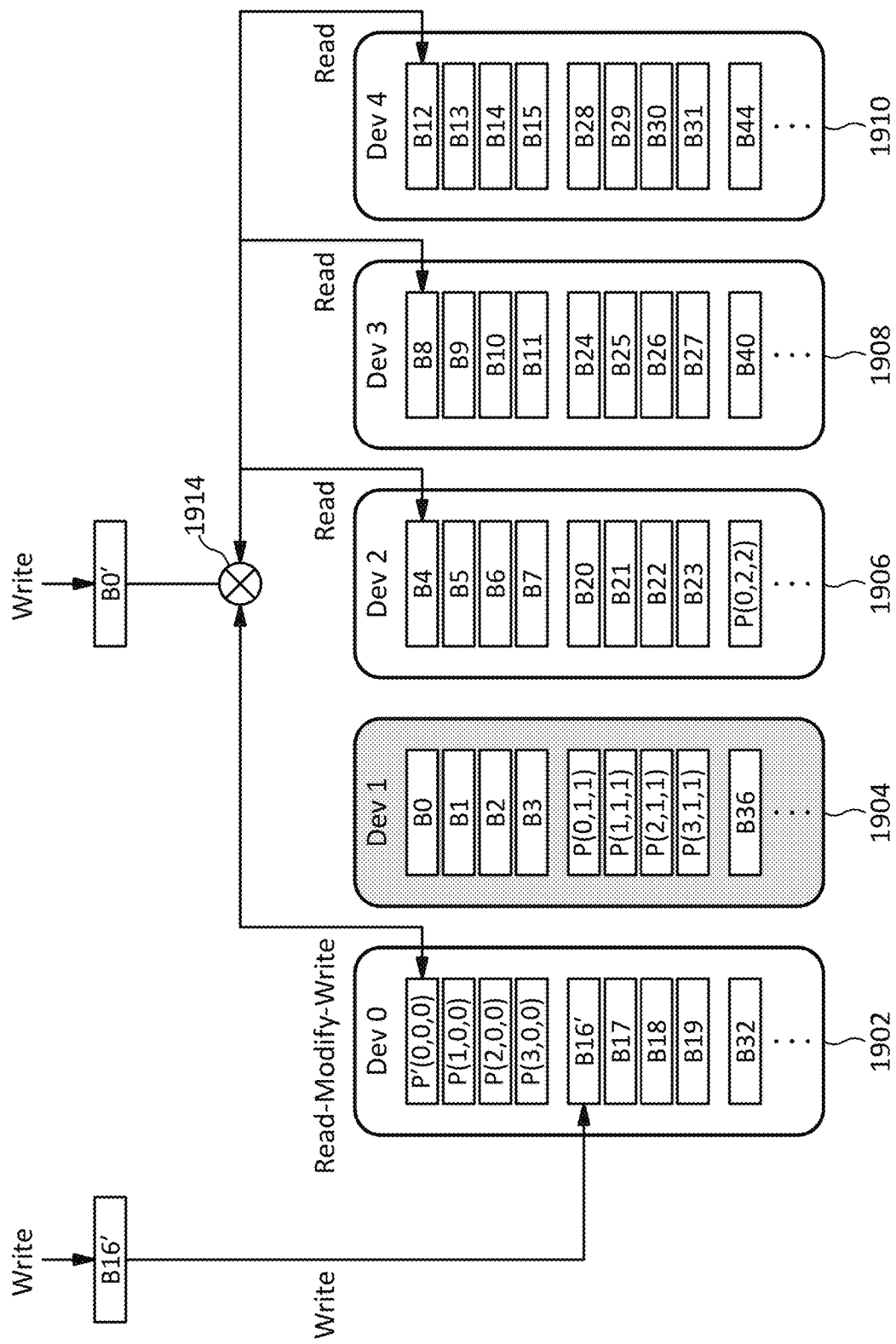
FIG. 19 illustrates example embodiments of write operations performed by a RAID-5 storage system without a fault resilient storage device in accordance with example embodiments of the disclosure.

FIGS. 18 and 19 illustrate example embodiments of write operations performed by a RAID-5 storage system without a fault resilient storage device in accordance with example embodiments of the disclosure. The embodiments illustrated in FIGS. 18 and 19 may include components similar to those in the embodiment illustrated in FIG. 12A. In the embodiments illustrated in FIGS. 18 and 19, storage devices 1804 and 1904 may experience fault conditions that may render them incapable of performing read or write operations.

FIG. 18 illustrates an operation to write updated data block B4' to healthy storage device 1806 in accordance with example embodiments of the disclosure. Because neither the original data block B4 nor the corresponding parity block P(0,0,0) are located on the faulty storage device 1804, the updated data block B4' may be written to storage device 1806. The corresponding updated parity block P'(0,0,0) may be calculated by reading the original parity block P(0,0,0) and performing a parity calculation on it with original data block B4 read from storage device 1806 and the updated data block B4' using parity logic 1814. The updated parity block P'(0,0,0) may then be written to healthy storage device 1802.

FIG. 19 illustrates example embodiments of write operations in which either the data block or the corresponding parity block are located on the faulty storage device 1904 in accordance with example embodiments of the disclosure. In the case of writing updated data block B16', the corresponding parity block P(0,1,1) is located on the faulty storage device 1904. Thus, the updated data block B16' may be written to healthy storage device 1902 without calculating parity for the stripe or reading any other data blocks.

In the case of writing updated data block B0', the original data block B0 may be recovered by reading the original parity block P(0,0,0) from healthy storage device 1902, and data blocks B4, B8, and B12 may be read from healthy drives 1906, 1908, and 1910, respectively, and processing them with parity logic 1914. The updated parity block P'(0,0,0) may then be calculated using the updated data block B0' and written to healthy storage device 1902. Although the updated data block B0' may not be written to the faulty storage device 1904, it may be recovered in future read operations by reading and performing a parity calculation on updated parity block P'(0,0,0) and data blocks B4, B8, and B12.

In the embodiments illustrated in FIG. 19, the lack of ability to read information from the faulty storage device 1904 may increase I/O operations, latency, power consumption for data transfers and/or parity calculations, and/or the like, and may also reduce system throughput, for example, by using I/O bandwidth that may otherwise be used by other I/O operations.

Figure 20:
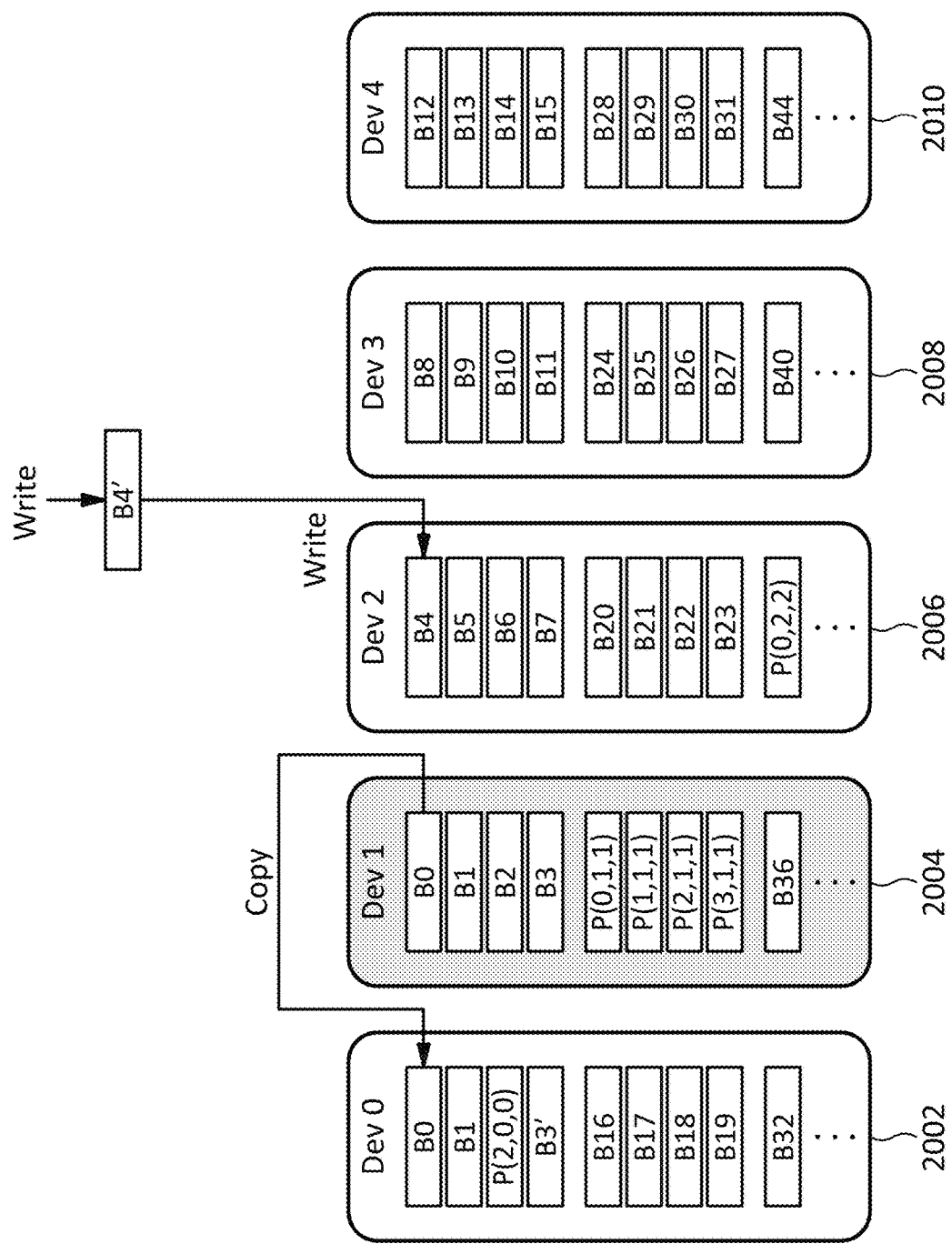
FIG. 20 illustrates an example embodiment of a write operation that may be performed by a RAID-5 storage system having a fault resilient storage device in accordance with example embodiments of the disclosure.
Figure 21:
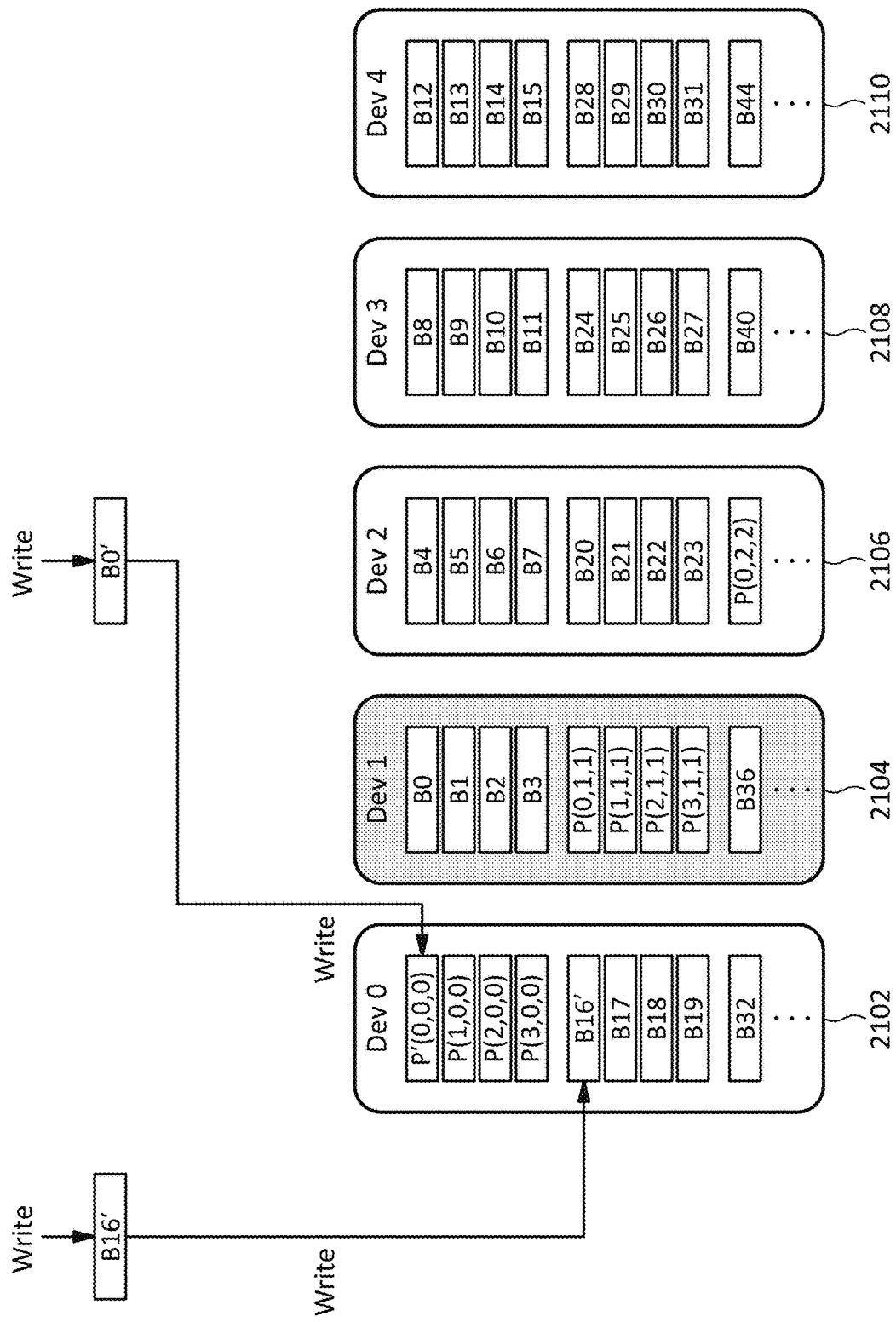
FIG. 21 illustrates example embodiments of write operations that may be performed by a RAID-5 storage system having a fault resilient storage device in accordance with example embodiments of the disclosure.

FIGS. 20 and 21 illustrate example embodiments of write operations that may be performed by a RAID-5 storage system having a fault resilient storage device in accordance with example embodiments of the disclosure. The embodiments of storage systems illustrated in FIGS. 20 and 21 may include components similar to those in the embodiment illustrated in FIG. 16 in which the faulty storage devices 2004 and 2104 may be implemented with a storage device capable of operating in a fault resilient mode with at least partial read capability in accordance with example embodiments of the disclosure. In the example embodiments illustrated in FIGS. 20 and 21, the faulty storage devices 2004 and 2104 may operate in a read-only mode, for example, by operating in one or more of the fault resilient modes FR_MODE_CAPACITY_READ_ONLY, FR_MODE_PERFORMANCE, FR_MODE_READ_ONLY, and/or FR_MODE_TEMP_READ_ONLY as described below with reference to FIG. 23.

In the embodiments illustrated in FIGS. 20 and 21, data may be copied from the faulty storage devices 2004 and 2104 to corresponding parity spaces on healthy storage devices 2002 and 2102, respectively, for example, in a background operation. At any time before, during, or after copying data from the faulty storage devices 2004 or 2104 to corresponding parity spaces, the system may operate indefinitely or temporarily without parity in a manner similar to a RAID-0 system.

FIG. 20 illustrates an embodiment in which a write operation may involve a data block on a healthy storage device in accordance with example embodiments of the disclosure. In this case, the updated data block B4' may be written to healthy storage device 2006 without calculating parity. In some embodiments, the system may also proactively copy data block B0 from the faulty storage device 2004 to the corresponding location in the parity space of healthy storage device 2002. This may enable the system to operate without parity (e.g., in a manner similar to a RAID-0 system) with respect to that portion of the stripe. Alternatively, the system may postpone copying the data block B0 from the faulty storage device 2004 to the corresponding location in the parity space of healthy storage device 2002 until a pre-build process begins.

FIG. 21 illustrates embodiments of write operations in which updated write data or a corresponding parity block may be located on the faulty storage device 2104, and a pre-rebuild process has not yet started in accordance with example embodiments of the disclosure. Updated data block B16' may be written to its normal location on healthy storage device 2102 without calculating parity. Updated data block B0' may be written to a corresponding location in parity space on healthy storage device 2102, again without calculating parity. This may enable the system to operate without parity (e.g., in a manner similar to a RAID-0 system) with respect to those portions of the stripes.

Depending on the implementation details, the embodiments illustrated in FIGS. 20 and 21 may reduce I/O operations, latency, power consumption for data transfers and/or parity calculations, synchronization, and/or the like, and may also increase system throughput, for example, by freeing up I/O bandwidth that may be used by other processes.

Figure 22:
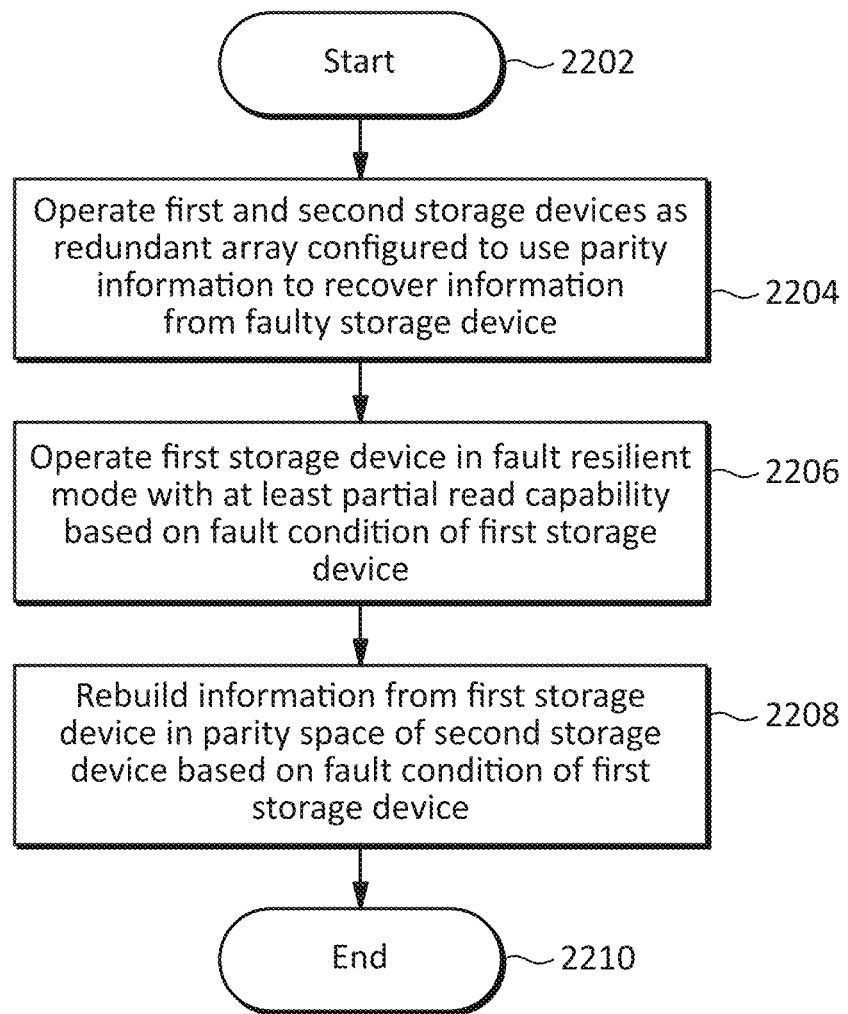
FIG. 22 illustrates an embodiment of a method for operating a storage array in accordance with example embodiments of the disclosure.

FIG. 22 illustrates an embodiment of a method for operating a storage array in accordance with example embodiments of the disclosure. The method may begin at operation 2202. At operation 2204, the method may operate a first storage device and a second storage device as a redundant array configured to use parity information to recover information from a faulty storage device. At operation 2206, the method may operate the first storage device in a fault resilient mode with at least partial read capability based on a fault condition of the first storage device. At operation 2208, the method may rebuild information from the first storage device in a parity space of the second storage device. The method may end at operation 2210.

The operations and/or components described with respect to the embodiment illustrated in FIG. 22, as well as all of the other embodiments described herein, are example operations and/or components. In some embodiments, some operations and/or components may be omitted and/or other operations and/or components may be included. Moreover, in some embodiments, the temporal and/or spatial order of the operations and/or components may be varied. Although some components may be illustrated as individual components, in some embodiments, some components shown separately may be integrated into single components, and/or some components shown as single components may be implemented with multiple components.

In some embodiments, LBA space types may be used, for example, to implement some embodiments of fault resilient modes. FIG. 23 illustrates a table of some example embodiments of fault resilient modes and associated LBA space types that may be implemented by a storage device in accordance with example embodiments of the disclosure. The Mode column of the table illustrated in FIG. 23 may include a fault resilient mode number and a name which may be used to identify the mode, for example, in an application programming interface (API) through which one or more features of a storage device may be accessed in accordance with example embodiments of the disclosure. The columns labeled as P, UP, RO, VRO, and IA in the table illustrated in FIG. 23 may indicate an amount of performing (P), underperforming (UP), read-only (RO), volatile read-only (VRO), and inaccessible (IA) LBA space, respectively, that may be used in the corresponding mode.

In some embodiments, the modes illustrated in FIG. 23 may be invoked, for example, by a host through an API. In some embodiments, a host may query the storage device using a get feature command as described below. In some implementations, modes identified with an asterisk (*) may provide a host with detailed information about each type of LBA space used by the mode in response to a get feature command. In some implementations, information about the LBA space used by the other commands may be implicit. For example, in the power cycle mode (Mode 1), all memory may be of the performing (P) type. In some embodiments, however, other combinations of LBA space types, and/or portions thereof, may be used.

In some embodiments, a storage device may implement any number of the following fault resilient modes. For example, a device manufacturer may implement different combinations of these and other fault resilient modes in different products.

A power cycle mode (Mode 1) may involve self-healing based on power cycling the storage device. For example, a storage device may experience a fault condition based on one or more flipped bits in memory such as SRAM or DRAM. A flipped bit may be caused, for example, by aging, heating, and/or radiation due to an antenna or high elevations above sea level which may interfere with memory cells. A storage device with a fault resilient power cycle mode may have self-healing capabilities such that power cycling the storage device (e.g., removing then reapplying power) may reset the current state and restore the failed SSD to a normal state. In this case, one or more inflight commands in a submission queue may be lost. Whether the user data of the storage device remains valid may depend on implementation details such as the partitioning of the device, the extent to which different circuits of the storage controller are reset, and/or the like. In some embodiments, in a power cycle mode, the entire storage space of the storage device (100 percent) may operate normally (e.g., as performing (P) space).

A reformat mode (Mode 2) may involve self-healing based on formatting all or a portion of the storage device. In some embodiments, formatting the storage device may reset its current state and restore the failed storage device to its normal state. However, depending on the implementation details (e.g., quick format, full format, partitioning details, and/or the like) all data on the disk may be lost. In some embodiments, in a reformat mode, the entire storage space of the storage device (100 percent) may operate normally (e.g., as performing (P) space).

In a reduced capacity read-only mode (Mode 3), a first portion of the storage space (e.g., X percent) of the storage device may operate normally (e.g., as performing (P) space), and a second portion (e.g., (100–X) percent) may operate as read-only (RO) storage space. Thus, the size of the performance (P) space in the storage device may be reduced, and the storage device may behave like a normal drive with respect to that space, but the read-only (RO) type of space may not be writable. In some embodiments, the storage device may provide a list of LBA ranges for the performance (P) and/or read-only (RO) spaces to a host, for example, in response to a get feature command. If the storage device supports the IO determinism, the LBA range may represent a set. If the storage device supports Zoned Namespaces (ZNS), the LBA range may represent a zone. In some embodiments, the storage device may also provide information about address ranges for sets and/or ZNS in response to a get feature command.

In a reduced capacity mode (Mode 4), a first portion of the storage space (e.g., X percent) of the storage device may operate normally (e.g., as performing (P) space), and a second portion (e.g., (100–X) percent) may be inaccessible (IA). Thus, the size of the performance (P) space in the storage device may be reduced, and the storage device may behave like a normal drive with respect to that space, but inaccessible (IA) space may not be available for normal inputs and or outputs (IOs). For example, if an RTBB is exhausted, the problematic die may be excluded from the disk space, and thus, the overall disk capacity may be reduced. The storage device may provide a list of LBA ranges for the performance (P) and/or inaccessible (IA) type of space. If the storage device supports the IO determinism, the LBA range may represent a set. If the storage device supports ZNS, the LBA range may represent a zone. In some embodiments, the storage device may provide information about the LBA ranges, sets, zones, and/or the like, in response to a get feature command.

In a reduced performance mode (Mode 5) one or more aspects of the performance of the storage device may be reduced. For example, the storage device may perform normal operations, but at reduced throughput and/or latency. In some embodiments, a storage device may include one or more back-up capacitors that, in the event of a loss of the main power supply, may provide power to the storage device for a long enough period of time to enable the storage device to complete a write operation. If one or more of these back-up capacitors fail, the storage device may not notify a host that a write operation is complete until after the data is written to the media. (This may be referred to as a synchronous write operation.) This may reduce the input and/or output operations per second (IOPS) and/or increase latency, thereby reducing the performance of the storage device. Thus, in some embodiments, reduced performance mode may operate with 100 percent underperforming (UP) space. Depending on the implementation details, some or all of the user data may remain valid. In some embodiments, the storage device may provide speculative performance information to a host which may enable the host to make decisions on sending write data to the storage device in a manner that may mitigate the system-level impact of the fault condition.

In a read-only mode (Mode 6), the storage device may only allow read operations and may block external write operations. Depending on the implementation details, data in read-only space may remain valid, for example, after the retention period. Read-only mode may operate with 100 percent read-only (RO) space.

In a partial read-only mode (Mode 7), a first portion of the storage space (e.g., X percent) of the storage device may operate as read-only (RO) space, and a second portion (e.g., (100–X) percent) may be inaccessible (IA) space. Thus, the storage device may only allow read operations and external write operations may be prohibited in the first portion of the storage space. Depending on the implementation details, data in the read-only space may still valid, for example, after the retention period. The storage device may provide a list of LBA ranges for the read-only (RO) and/or inaccessible (IA) types of space. If the storage device supports the IO determinism, the LBA range may represent a set. If the storage device supports ZNS, the LBA range may represent a zone. In some embodiments, the storage device may provide information about the LBA ranges, sets, zones, and/or the like, in response to a get feature command.

In a temporary read-only mode (Mode 8), data may be read from the storage space of the storage device, which may operate with 100 percent VRO space, but external writes may be prohibited. Data in this space may be temporarily valid but may become invalid after the retention period.

In a temporary partial read-only mode (Mode 9), data may be read from a first portion (e.g., X percent) of the storage space of the storage device, which may operate as VRO space, while external writes may be prohibited. A second portion (e.g., (100–X) percent) may be inaccessible (IA) space. Data in the first portion may be temporarily valid but may become invalid after the retention period. If the storage device supports the IO determinism, the LBA range may represent a set. If the storage device supports ZNS, the LBA range may represent a zone. In some embodiments, the storage device may provide information about the LBA ranges, sets, zones, and/or the like, in response to a get feature command.

In a vulnerable mode (Mode 10), the storage device may not be available for I/O operations. However, it may continue to receive commands from the host and return errors.

In a normal mode (Mode 11), the storage device may operate normally.

The embodiments disclosed above have been described in the context of various implementation details, but the principles of this disclosure are not limited to these or any other specific details. For example, some functionality has been described as being implemented by certain components, but in other embodiments, the functionality may be distributed between different systems and components in different locations and having various user interfaces. Certain embodiments have been described as having specific processes, operations, etc., but these terms also encompass embodiments in which a specific process, step, etc. may be implemented with multiple processes, operations, etc., or in which multiple processes, operations, etc. may be integrated into a single process, step, etc. A reference to a component or element may refer to only a portion of the component or element. For example, a reference to an integrated circuit may refer to all or only a portion of the integrated circuit, and a reference to a block may refer to the entire block or one or more subblocks. The use of terms such as first and second in this disclosure and the claims may only be for purposes of distinguishing the things they modify and may not indicate any spatial or temporal order unless apparent otherwise from context. In some embodiments, based on may refer to based at least in part on. In some embodiments, disabled may refer to disabled at least in part. A reference to a first element may not imply the existence of a second element. Various organizational aids such as section headings and the like may be provided as a convenience, but the subject matter arranged according to these aids and the principles of this disclosure are not defined or limited by these organizational aids.

The various details and embodiments described above may be combined to produce additional embodiments according to the inventive principles of this patent disclosure. Since the inventive principles of this patent disclosure may be modified in arrangement and detail without departing from the inventive concepts, such changes and modifications are considered to fall within the scope of the following claims.

The invention claimed is:

1. A method comprising:
   operating a first storage device and a second storage device as a redundant array group configured to use parity information to recover information from a faulty storage device, wherein the first storage device is configured to store first data, and the second storage device is configured to store second data, and wherein the second storage device comprises a parity space and a data space;
   operating the first storage device in a fault resilient mode comprising a modified access mode with at least partial read capability based on a fault condition of the first storage device; and
   copying at least a portion of the first data from the first storage device to the parity space of the second storage device.

2. The method of claim 1, further comprising copying the at least a portion of the first data from the parity space of the second storage device to a replacement storage device.

3. The method of claim 2, further comprising calculating parity information for at least a portion of the at least a portion of the first data.

4. The method of claim 1, further comprising writing write data for a write operation of the first storage device in the parity space of the second storage device.

5. The method of claim 4, further comprising copying the write data from the parity space of the second storage device to a replacement storage device.

6. The method of claim 1, wherein the copying the at least a portion of the first data from the first storage device to the parity space of the second storage device is performed, at least in part, by a background process.

7. The method of claim 1, wherein the copying the at least a portion of the first data from the first storage device to the parity space of the second storage device is performed, at least in part, by a batch process.

8. The method of claim 1, further comprising reading read data for a read operation of the first storage device based on a build point of the parity space of the second storage device.

9. The method of claim 8, wherein the read data for the read operation is read from the first storage device.

10. The method of claim 8, wherein the read data for the read operation is read from the at least a portion of the first data in the parity space of the second storage device.

11. The method of claim 1, further comprising:
   updating write data for a write operation of the first storage device in the parity space of the second storage device; and
   reading, for a read operation of the first storage device, the write data from the parity space of the second storage device.

12. The method of claim 1, further comprising:
   receiving write data for a write operation of the first storage device; and
   writing the write data to the parity space of the second storage device.

13. A system comprising:
   a controller;
   a first storage device; and
   a second storage device;
   wherein the first storage device is capable of operating in a fault resilient mode comprising a modified access mode with at least partial read capability based on a fault condition of the first storage device;
   wherein the second storage device comprises a parity space and a data space; and
   wherein the controller is configured to:
   operate the first storage device and the second storage device as a redundant array group configured to use parity information to recover information from a faulty storage device;
   store first data at the first storage device;
   store second data at the second storage device; and
   copy at least a portion of the first data from the first storage device to the parity space of the second storage device.

14. The system of claim 13, wherein the controller is further configured to copy the at least a portion of the first data from the parity space of the second storage device to a replacement storage device.

15. The system of claim 13, wherein the controller is further configured to read data for a read operation from the first storage device based on a build point of the parity space of the second storage device.

16. The system of claim 13, wherein the controller is further configured to:
   receive write data for a write operation of the first storage device; and
   write the write data to the parity space of the second storage device.

17. A storage array controller comprising a processor configured to:
   operate a first storage device, and a second storage device as a redundant array of independent storage devices (RAID) group with parity, wherein the second storage device comprises a parity space and a data space;
   store first data at the first storage device;
   store second data at the second storage device;
   operate the first storage device in a fault resilient mode comprising a modified access mode with at least partial read capability based on a fault condition of the first storage device; and
   copy at least a portion of the first data from the first storage device to the parity space of the second storage device.

18. The storage array controller of claim 17, wherein the processor is further configured to read data for a read operation from the first storage device based on a build point of the parity space of the second storage device.

* * * * *